(12) United States Patent
Mintz

(10) Patent No.: US 9,853,955 B2
(45) Date of Patent: Dec. 26, 2017

(54) TECHNIQUES FOR SECURING DELIVERY OF AN AUDIO MESSAGE

(71) Applicant: Facebook, Inc., Menlo Park, CA (US)

(72) Inventor: Shahar Mintz, Tel Aviv (IL)

(73) Assignee: FACEBOOK, INC., Menlo Park, CA (US)

( * ) Notice: Subject to any disclaimer, the term of this patent is extended or adjusted under 35 U.S.C. 154(b) by 258 days.

(21) Appl. No.: 14/580,361

(22) Filed: Dec. 23, 2014

(65) Prior Publication Data

US 2016/0182464 A1    Jun. 23, 2016

(51) Int. Cl.
| | |
|---|---|
| *H04L 29/06* | (2006.01) |
| *H04L 9/30* | (2006.01) |
| *H04W 12/06* | (2009.01) |
| *H04L 9/32* | (2006.01) |
| *H04W 12/02* | (2009.01) |
| *H04L 9/08* | (2006.01) |

(52) U.S. Cl.
CPC ........ *H04L 63/0442* (2013.01); *H04L 9/0825* (2013.01); *H04L 9/0866* (2013.01); *H04L 9/3228* (2013.01); *H04L 9/3231* (2013.01); *H04L 63/0861* (2013.01); *H04W 12/02* (2013.01); *H04W 12/06* (2013.01)

(58) Field of Classification Search
CPC . H04L 63/0442; H04L 9/0825; H04L 9/0866; H04L 9/3228; H04L 63/0861; H04L 9/3231; H04L 9/30; H04W 12/06; H04W 12/02

USPC ..... 713/168, 170, 189; 455/410, 411; 726/7, 726/2–4, 26–28
See application file for complete search history.

(56) References Cited

U.S. PATENT DOCUMENTS

| | | | | |
|---|---|---|---|---|
| 4,349,695 A | * | 9/1982 | Morgan | H04L 9/0637 340/5.8 |
| 6,148,404 A | * | 11/2000 | Yatsukawa | G06F 21/335 380/30 |
| 6,154,543 A | * | 11/2000 | Baltzley | G06F 21/00 380/255 |
| 2003/0135740 A1 | * | 7/2003 | Talmor | H04L 9/3231 713/186 |
| 2010/0291952 A1 | * | 11/2010 | Gosset | H04W 4/02 455/466 |
| 2010/0308999 A1 | * | 12/2010 | Chornenky | G08B 6/00 340/573.1 |
| 2011/0215921 A1 | * | 9/2011 | Ben Ayed | G08B 1/08 340/539.11 |
| 2013/0080763 A1 | * | 3/2013 | Lee | H04L 9/3231 713/150 |
| 2013/0102297 A1 | * | 4/2013 | Chavernac | G06F 21/31 455/415 |
| 2014/0089128 A1 | * | 3/2014 | Stauffer | H04N 21/47815 705/26.5 |
| 2015/0046711 A1 | * | 2/2015 | Slaby | H04L 63/08 713/170 |

(Continued)

*Primary Examiner* — Shanto M Abedin

(57) ABSTRACT

Techniques for securing the delivery of an audio message on a device are described. A method may include receiving a message encrypted with a public key from a sender at a recipient device; authenticating a recipient using an image of an ear of the recipient; retrieving a private key when the authentication succeeds; decrypting the message using the private key; and presenting the decrypted message through a speaker on the recipient device. Other embodiments are described and claimed.

20 Claims, 18 Drawing Sheets

(56) References Cited

U.S. PATENT DOCUMENTS

2015/0332273 A1* 11/2015 Bruno .............. G06Q 20/40145
  705/44
2015/0381575 A1* 12/2015 Bhargav-Spantzel H04L 63/0428
  713/168

* cited by examiner

TECHNIQUES FOR SECURING DELIVERY OF AN AUDIO MESSAGE

BACKGROUND

Efforts to prevent the unauthorized access to communications usually include encryption and/or recipient authentication. For example, voicemail services may require a passcode to access the messages; electronic messages may be encrypted. None of the existing technologies, however, can ensure that only the intended recipient consumes the message once the message is decrypted or the authentication succeeds. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for securing delivery of an audio message. Some embodiments are particularly directed to techniques for using an image of the recipient's ear to secure and unlock a private key for decryption, and proximity detection to ensure that only the recipient hears the decrypted message. In one embodiment, for example, a method may include receiving a message encrypted with a public key from a sender at a recipient device; authenticating a recipient using an image of an ear of the recipient; retrieving a private key when the authentication succeeds; decrypting the message using the private key; and presenting the decrypted message through a speaker on the recipient device. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
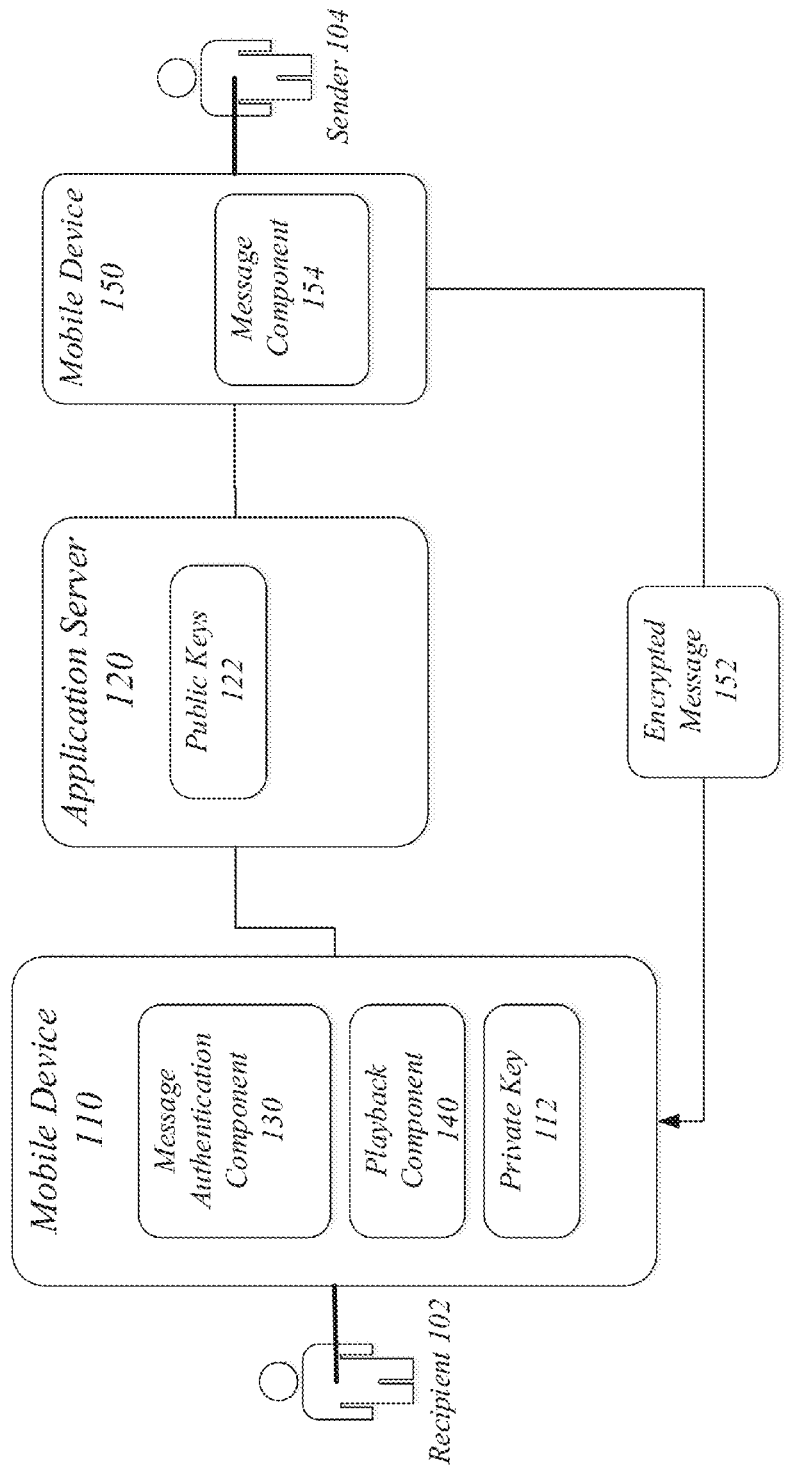
FIG. 1 illustrates an embodiment of an execution system for securing delivery of an audio message.

Various embodiments are generally directed to techniques for secure delivery of an audio message. Some embodiments are particularly directed to techniques for using the characteristics of a recipient's ear to uniquely identify the recipient and decrypt a message, and to ensure that only the intended recipient hears the message.

While encryption methods to secure messages from being decoded by unintended operators can be very effective at preventing unauthorized access, encryption can be broken, passwords can be guessed or hacked, and some people share their access information, for example, with spouses, close friends, or support staff. There may be situations where a sender wants to make sure that only the recipient can hear a message. For example, one partner (A) in a couple may wish to plan a surprise party for the other partner (B), who might otherwise be able to check email or voicemail messages on partner A's phone or mobile device. A business person may need to keep some messages confidential, even from support staff. A person in a position of national security may need to receive messages for only themselves. The embodiments are not limited to these examples.

It is believed that the characteristics of a person's ear may be unique to that individual, as fingerprints are believed to be unique to an individual. Accordingly, embodiments allow an individual to use their ear to secure a private key in a public/private key pair, and to use their ear to self-authenticate when a message is received that was encrypted using their public key. The embodiments also restrict the recipient to using an earpiece speaker, and not a loudspeaker or headphones, and play the audio message only while the playback device is within a defined proximity to the ear. As a result, the embodiments can both secure a message from unauthorized access and prevent unintended, otherwise authorized individuals, from hearing a message intended only for the recipient.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to an apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct a more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for an execution system 100 for securing the delivery of audio messages to a recipient. In one embodiment, the system 100 may comprise a computer-implemented system 100 having a mobile device 110 operated by a recipient 102, an application server 120, and a device 150 operated by a sender 10, each comprising one or more components. Although the system 100 shown in FIG. 1 has a limited number of elements in a certain topology, it may be appreciated that the system 100 may include more or fewer elements in alternate topologies as desired for a given implementation.

The execution system 100 ("system 100") may include a mobile device 110. The mobile device 110 may be any mobile electronic device capable of, at least, taking pictures with an included camera, outputting audio data to the recipient 102, and communicating with other devices, e.g. an application server 120, to exchange data and instructions over a network. The mobile device 110 may further be capable of image analysis, and encryption/decryption operations.

The mobile device 110 may include various software components, such as a message authentication component 130 and a playback component 140. The message authentication component 130 and the playback component 140 may comprise instructions that when executed by a processing circuit (not shown) cause the mobile device 110 to perform the operations of the message authentication component 130 and the playback component 140, respectively, as will be described herein. Generally, the message authentication component 130 and the playback component 140 may be provided on the mobile device 110 at the time of purchase, or may installed by the recipient 102, and may enable the authentication, decryption and playback of messages in audio form to the recipient 102.

The message authentication component 130 may generate a public/private key pair for the recipient 102. The public key of the key pair may be shared or sent to an application server 120 to be provided to senders who which to encrypt messages to the recipient 102. The message authentication component 130 may use pictures taken of one or both ears of the recipient 102 to protect the private key 112 of the key pair, and may use pictures of the recipient's ear(s) to authenticate the recipient 102 at the time of decrypting and playing a message 152 that was encrypted using the public key of the key pair, as will be described further below.

The playback component 140 may, once the encrypted message 152 is decrypted and the recipient is authenticated, play the decrypted message in audio form in such a way that only the recipient can hear the message. For example, the playback component 140 may restrict which audio output on the mobile device is used, and may monitor the proximity of the mobile device 110 to an ear of the recipient 102 to prevent eavesdropping by others.

The system 100 may also include an application server 120. The application server 120 may include any computing device capable of communication with other computing devices such as mobile device 110 and device 150 over a network to exchange data and instructions.

The application server 120 may store public keys 122, generated by various mobile devices, e.g. the mobile device 110. The public keys 122 may each be a component of a public/private key pair, where the mobile device that generates the key pair stores the private key 112 of the key pair on the mobile device. The application server 120 may receive a request for a public key 122 from a device 150 operated by a sender 104. The application server 120 may provide the requested public key 122 to the requesting device. The application server 120 may also temporarily store encrypted messages for a recipient until the message is retrieved by the sender, and may provide notification that a message is available. The operations of the application server 120 are described in greater detail with respect to FIG. 4 below.

The system 100 may also include a device 150. The device 150 may be any electronic device capable to requesting and receiving a public key from the application server 120 or from the mobile device 110, and capable of encrypting and sending a message 152 to the application server 120 or to the mobile device 110. The device 150 may be a mobile device such as a smartphone or tablet computer, or may be a laptop computer, a desktop computer, or a telephone system with messaging capability.

The device 150 may include a message component 154. The message component 154 may be a software application that allows a sender 104 to compose or record a message, encrypt the message, and send the message to the recipient. The message component 154 may be, for example, and without limitation, an electronic mail application, a short-message-service (SMS) message application, a multimediamessage-service (MMS) message application, a group communication application, a telephone voicemail system application, a video-communication application, and so forth. The message component 154 may accept an address for the recipient, such as an e-mail address, a chat handle, a telephone number, a user name within a social network service, and so forth.

Figure 2:
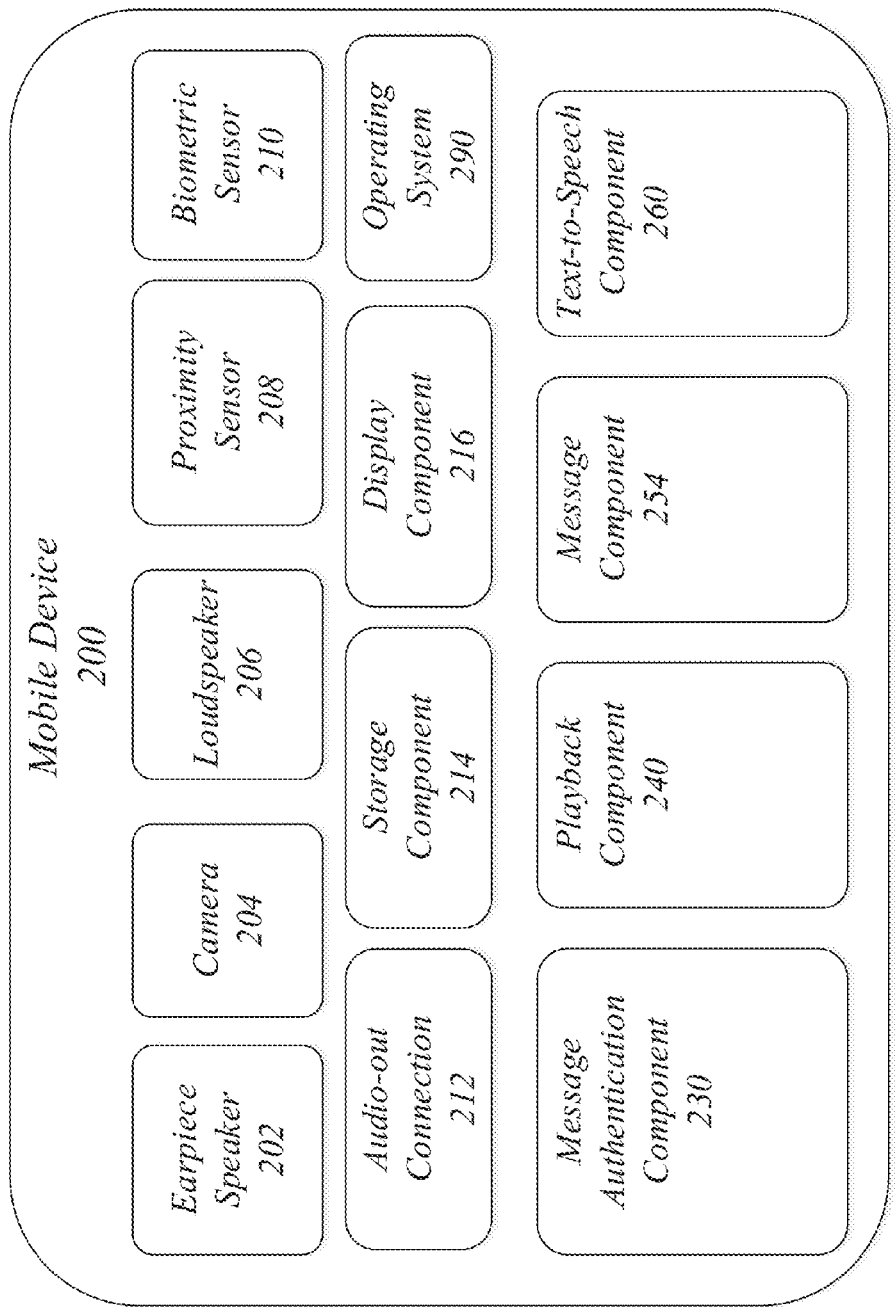
FIG. 2 illustrates an embodiment of a mobile device for the system of FIG. 1.

FIG. 2 illustrates a block diagram of a mobile device 200 for the system 100. The mobile device 200 may be an embodiment of mobile device 110. The mobile device 200 may include various hardware components and software components. The hardware components may include various audio-output components, such as an earpiece speaker 202, a loudspeaker 206, and an audio-out connection 212. The hardware components may also include a camera 204, a proximity sensor 208 and a biometric sensor 210. Other hardware components may also be included, such as various input components, e.g. a microphone, a keyboard or keypad, a touch-sensitive interface, as well as a global positioning system (GPS) component, an altimeter, and so forth.

The earpiece speaker 202 may be a speaker designed to output sound into a recipient's ear when the mobile device 200 is held close to the ear. The loudspeaker 206, in contrast, may be a speaker designed to output sound so as to be audible by those not in proximity to the earpiece speaker, for example, as in a speaker-phone. The audio-out connection 212 may be a head-phone jack or other input mechanism used to connect another device for audio output, such as headphones, an external speaker, a television, and so forth.

The camera 204 may be a camera integrated into the mobile device 200 that can take digital photographs (also referred to as "pictures", "images," and "photos") through a lens and store the digital photos. In some embodiments, the camera 204 may use the display component 216 to display the scene that will be photographed, and to display stored photos. In some embodiments, the camera 204 may be able to take a photograph from either side of the mobile device 200, e.g. from the front side or from the back side of the mobile device 200. The camera 204 may take photographs using visible light, infra-red light, and/or ultraviolet light.

The proximity sensor 208 may include hardware and/or software to detect how close the mobile device 200 is to another object, e.g. to the head or ear of the recipient 102. The proximity sensor 208 may use camera information to detect proximity visually, and may specifically detect whether some or all of the ear is within the camera view. The proximity sensor 208 may, in combination with, or as part of, a touch-sensitive interface, detect proximity based on touch with human skin, or based on heat detected from skin. The proximity sensor 208 may use a sound emitted from the earpiece speaker 202 and received by a microphone (not shown) to use echo-location to detect proximity to an object. The embodiments are not limited to these examples.

The biometric sensor 210 may detect touch, heat, odor, sound or other biological signs of a human presence, such a heartbeat, a biologically produced electrical signal, gases present in exhalations and so forth. The proximity sensor 208 may use or be integrated with the biometric sensor 210 to detect proximity to a human being.

The display component 216 may include any interface components capable of presenting visual information to the recipient 102, such as, but not limited to, a screen for visual output. In some embodiments, the display component 216 may be touch-sensitive display screen.

The mobile device 200 may further include a storage component 214 in the form of one or more computer-readable storage media capable of storing data and instructions for the functions of software, such as a message authentication component 230, a playback component 240, a message component 254, a text-to-speech component 260, and an operating system 290. The storage component 214 may store the private key 112. As used herein, "computer-readable storage medium" is not intended to include carrier waves, or propagating electromagnetic or optical signals.

The message authentication component 230 and the playback component 240 may be embodiments of the message authentication component 130 and the playback component 140, respectively. The message authentication component 230 will be described in greater detail with respect to FIG. 3. The playback component 240 may, as previously described, play a decrypted message through the earpiece speaker 202, while preventing the message from being played through either the loudspeaker 206 or the audio-out connection 212. Additionally, the playback component 240 may receive proximity data from the proximity sensor 208, and may stop playback of the message if the proximity of the mobile device 200 to the ear or head of the recipient 102 exceeds a threshold distance.

The message component 254 may be an embodiment of the message component 154, and may be used by the recipient 102 when the recipient 102 wishes to compose and send a message, as a sender, to another recipient. The message component 254 may also be used to view or hear non-encrypted messages.

The text-to-speech component 260 may be used to output a text-based decrypted message as an audio signal through the earpiece speaker 202. For example, the text-to-speech component 260 may convert text from an SMS message, a MMS message, an e-mail message, or a group communication message to speech.

The mobile device 200 as shown in FIG. 2 is an example and is not limited to the components shown. More, fewer, or other components may be used to provide the described functionality. Additionally, some of the components may be combined into other functional units without departing from the concepts herein.

Figure 3:
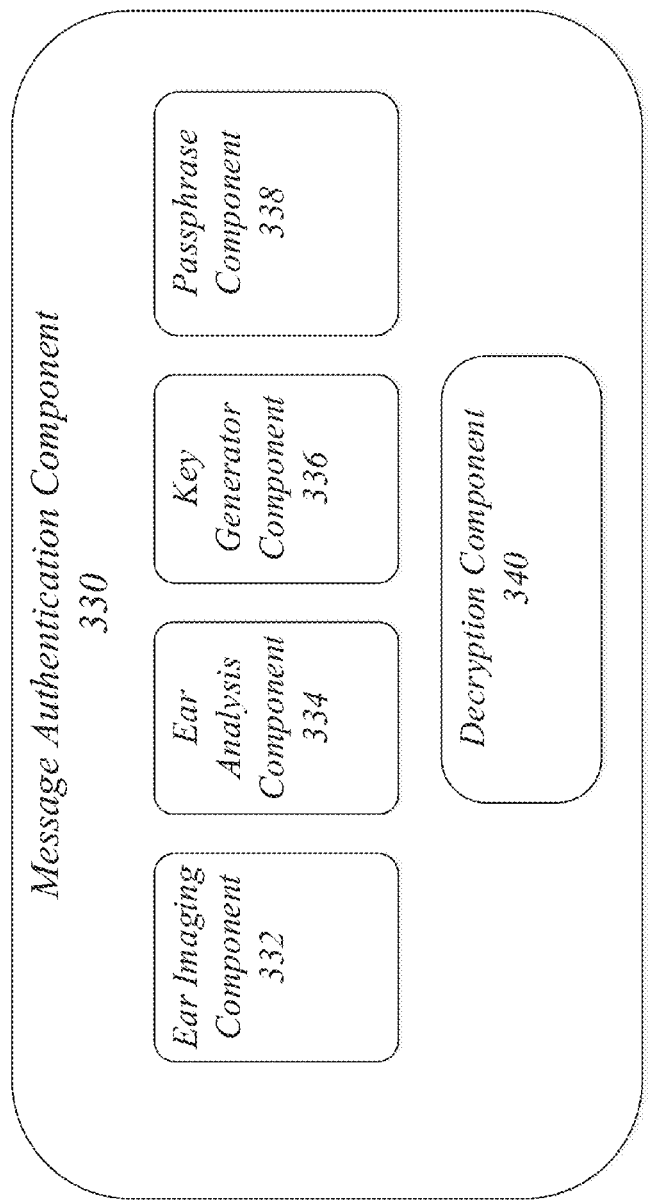
FIG. 3 illustrates an embodiment of a message authentication component for the system of FIG. 1.

FIG. 3 illustrates a block diagram of a message authentication component 330 for the system 100. The message authentication component 330 may be an embodiment of the message authentication component 130 or 230. The message authentication component 330 may include various functional components to perform the methods and operations described herein, such as, but not limited to, an ear imaging component 332, an ear analysis component 334, a key generator component 336, a passphrase component 338, and a decryption component 340. More, fewer, or other components may be used to provide the described functionality.

The ear imaging component 332 may guide the user, e.g. the recipient 102, through taking a useable picture of the recipient's ear. Because it may be difficult for the user to determine whether their ear is actually in the view of the camera, the ear imaging component 332 may use an image recognition algorithm to analyze the view of the camera for pixels that look like an ear. The ear imaging component 332 may guide the user, for example, by audible instructions played through the earpiece speaker 202 or the loudspeaker 206 to move the mobile device 200 to the left, right, up or down until an ear is detected in the view. In some embodiments, if the camera is capable of viewing from both sides of the device, the ear imaging component 332 may require that only the camera view from the same side as the earpiece speaker be used to photograph the ear.

The ear imaging component 332 may also analyze lighting conditions, contrast, and other imaging parameters, to guide the user to point where a useable image of the ear is present in the view of the camera. Once a useable image is present, the ear imaging component 332 may control the camera 204 and cause the image to be captured as a photograph.

The ear analysis component 334 may receive the photo of the ear, from the ear imaging component 332, from the camera 204, or from storage component 214, and may analyze the image. Analyzing may include any number of techniques to convert the photo of the ear into a numeric representation that can uniquely identify the ear, and this, the recipient. For example, and without limitation, analyzing may include identifying one or more features on the ear, such as the ear lobe, the top of the ear, the location of the opening to the middle ear, prominent ridges, and so forth. Measurements of the features, distances between features, ratios of measurements or distances, and so forth, may be used to uniquely identify the ear. In the event that one ear does not uniquely identify a person or does not identify a person with sufficient certainty, images of both ears of the recipient may be used, in combination, to identify a person with a higher certainty than can be provided by using only one ear. Once the numeric representation is obtained, the photos of the ear(s) may be deleted from the mobile device.

In some embodiments, the ear analysis component 334 may convert a color picture of the ear into a gray-scale, or black and white, image, and may perform a function on the pixel values to generate a numeric representation of the image. In still other embodiments, the ear analysis component 334 may perform a function on the original pixel values, such as a hash function, to obtain a numeric representation. The embodiments are not limited to these examples.

The key generator component 336 may generate a public/private key pair for the recipient, for example, according to the GNU Privacy Guard (GPG) encryption system. The public key may be passed to a key exchange server, e.g. to the application server 120. The private key may be kept and stored on the mobile device 110, 200. Of note is that the photo of the ear and the numeric representation of the ear are stored only on the device that took the photo: they are not shared with the application server 120.

The passphrase component 338 may use the numeric representation from the ear analysis component 334 to generate a passphrase that is used to lock the private key to prevent unauthorized access and decryption by anyone other than the recipient. The passphrase may be unique to the numeric representation. In some embodiments, the passphrase is further protected by being hashed.

When an encrypted message is received, the ear imaging component 332, the ear analysis component 334 and the passphrase component 338 may perform the same or similar operations on a newly acquired image of the recipient's ear to generate a second passphrase.

The decryption component 340 may then use the generated second passphrase, or a hashed value of the generated second passphrase to unlock the stored private key. Unlocking may be successful if the second passphrase and the initial passphrase are identical or sufficiently similar, within a tolerance, to each other. The decryption component 340 may decrypt the received encrypted message with the private key according to whatever encryption schema was used. The decryption component 340 may also provide encryption operations when the recipient wishes to encrypt a message, as a sender.

Figure 4:
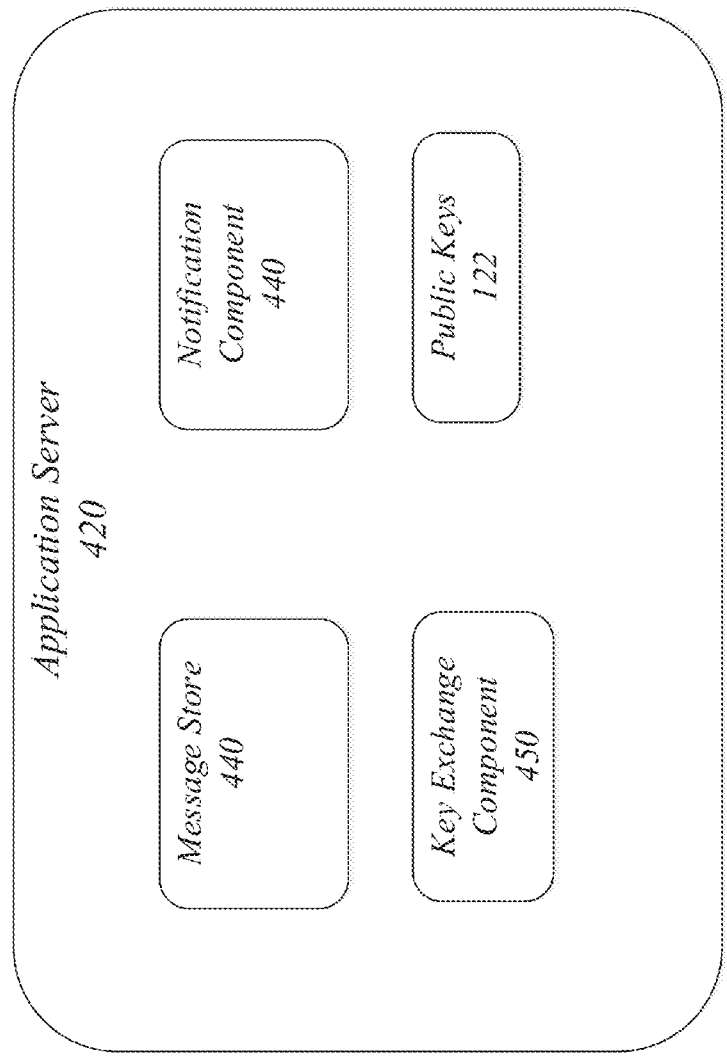
FIG. 4 illustrates an embodiment of an application server for the system of FIG. 1.

FIG. 4 illustrates an embodiment of an application server 420 for the system 100. The application server 420 may be an embodiment of the application server 120. The application server 420 may include various functional components to perform the methods and operations described herein, such as, but not limited to, a notification component 440 and a key exchange component 350. The application server 420 may also include a message store 430, and the stored public keys 122. The application server 420 may be implemented with one computing device, or across multiple computing devices.

The message store 430 may be some or all of a storage medium that temporarily stores encrypted messages 152 received at the application server 420 from senders before the intended recipient has received the message. In some embodiments, the message store 430 may be a separate computing device, external storage drive or other separate from the rest of the application server 420, but accessible to the application server 420.

The notification component 440 may notify a recipient when an encrypted message has been received for the recipient. Notifying may include, for example, sending a separate message of the same format as the encrypted message to the same address to which the encrypted message was sent. For example, if an encrypted e-mail message is sent to the address "recipient@email.com", then the notification may be sent as an unencrypted e-mail message to the same address. Other forms of notification may include, without limitation, a SMS message, a MMS message, a voicemail message, or command to the message component 254 to output a visual or audio alert to the recipient. In some embodiments, the notification may include a link that when accessed by the recipient, requests that the encrypted message be retrieved from the message store 430 and delivered to the recipient mobile device.

The key exchange component 450 may receive and store public keys 122 from recipients who wish to use encryption for their messages. The key exchange component 450 may also receive and fulfill requests from senders for the public key 122 of a recipient. In some embodiments, the public keys 122 may be stored by the key exchange component 450 in a database or other data structure that connects a public key to one or more addressing mechanisms for a recipient. In an embodiment, for example, a recipient may need a separate public keys for a telephone number and for an e-mail address. In another embodiment, multiple addressing mechanisms for one recipient may be linked to one public key.

Figure 5:
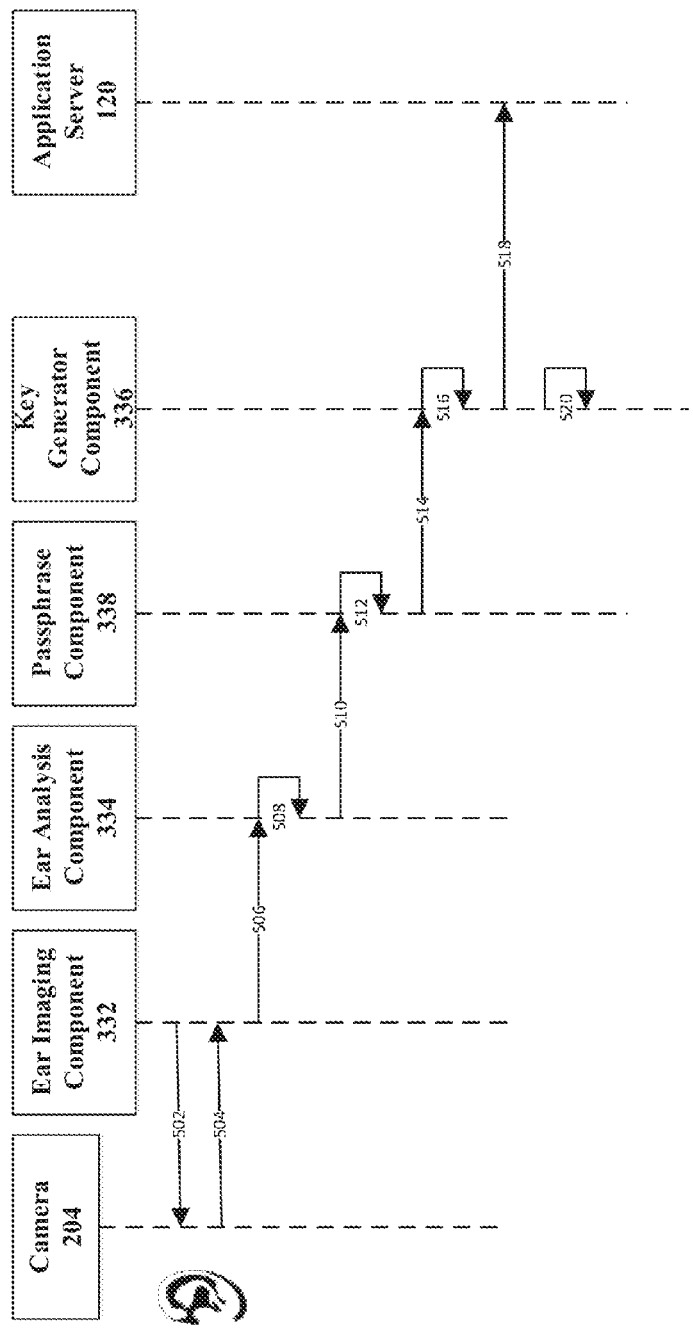
FIG. 5 illustrates an embodiment of a message flow for the system of FIG. 1.

FIG. 5 illustrates an embodiment of a message flow 500 for the system 100. The message flow 500 may represent messages communicated among the components of system 100. In particular, the message flow 500 may occur among the components of the mobile device 110, 200, and more particularly, among the components of the message authentication component 330.

In the message flow 500, time flows from the top of the diagram toward the bottom. As used in FIG. 5, a "message" may include data and/or instructions communicated from one component to another, as well as internal functions within a component. Message flow 500 may represent messages communicated during the generation of a public/private key pair for the recipient using an image taken of the recipient's ear.

The message flow 500 begins when the ear imaging component 332 instructs the camera 204 to take a photograph of the user's ear in message 502. This process may also include outputting prompts to the user, e.g. the recipient 102, to move the mobile device into a position where the ear appears in the view of the camera.

The message flow 500 continues when the camera 204 takes the picture, and sends the ear image to the ear imaging component 332 in message 504. In some embodiments, the camera 204 may store the ear image in a storage medium for retrieval by the ear imaging component 332.

The message flow 500 continues when the ear imaging component 332 forwards or otherwise provides the ear image to the ear analysis component 334 in message 506. The message 506 may also include a command or directive to the ear analysis component 334 to begin an analysis of the ear image.

The message flow 500 continues when the ear analysis component 334 performs a numeric analysis of the ear image, in message 508. The analysis may include identifying prominent or primary features of the ear on the ear image, taking measurements of the ear, performing a statistical analysis of the image, hashing the values of the pixels in the image, or any other analysis that results in numeric data. The numeric data may include a numeric or binary representation of the image that is substantially unlikely to occur from the same analysis of an image of a different ear.

The message flow 500 continues when the ear analysis component 334 passes the numeric data to the passphrase component 338 in message 510. The message 510 may include a command or directive to the passphrase component 338 to generate a passphrase using the numeric data.

The message flow 500 continues when the passphrase component 338 generates a passphrase in message 512. Generating a passphrase may use the numeric data, for example, as an input to an algorithm, formula, or other sequence of operations that generates a passphrase from the input. In general, different numeric data should generate a different passphrase, while using the same numeric data at different times should generate the same passphrase. In some embodiments, the passphrase may be hashed or otherwise obscured to render it more secure.

The message flow 500 continues when the passphrase component 338 instructs the key generator component 336 to make a key pair in message 514. In some embodiments, the message 514 may also include the passphrase or the obscured passphrase.

The message flow 500 continues when the key generator component 336 generates a public/private key pair in message 516. The key pair may be generated by any method, e.g. using GPG, that results in two keys that allow a data item, such as a message, to be encrypted with the public key and decrypted with the private key.

The message flow 500 continues when the key generator component 336 sends the public key of the key pair to the application server 120 in message 518. The message 518 may also include one or more identifying information items about the recipient, such as one or more messaging addresses and phone numbers. The application server 120 stores the public key and may provide the public key to any requesting sender.

The message flow 500 continues when the key generator component 336 securely stores the private key of the key pair in message 520. Secure storage may include locking the private key with the passphrase or the obscured passphrase such that the private key can only be retrieved for use with the passphrase or the obscured passphrase. Any copies of the passphrase generated in message 512 that are present in volatile or non-volatile storage on the mobile device may be erased once the private key is securely stored.

Figure 6:
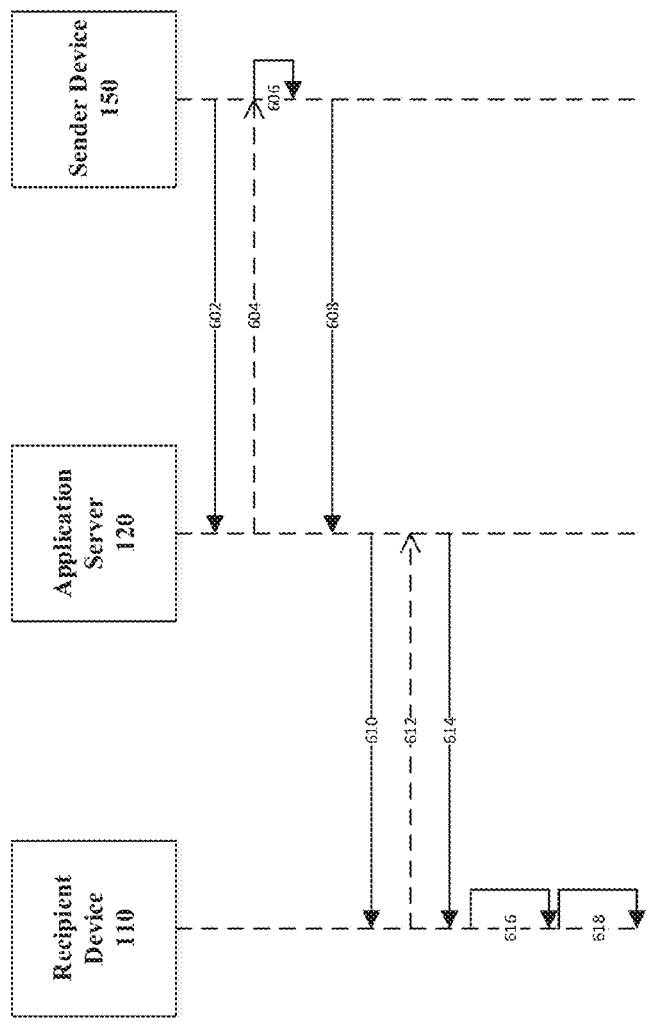
FIG. 6 illustrates an embodiment of a second message flow for the system of FIG. 1.

FIG. 6 illustrates an embodiment of a message flow 600 for the system 100. The message flow 600 may represent messages communicated among the components of system 100. The message flow 600 may occur among the recipient mobile device 110, the application server 120 and the sender device 150.

In the message flow 600, time flows from the top of the diagram toward the bottom. As used in FIG. 6, a "message" may include data and/or instructions communicated from one component to another, as well as internal functions within a component. The message flow 600 may represent messages communicated when a sender encrypts and send a message to the recipient. The message flow 600 assumes that the recipient has already created a public key, as shown for example in message flow 500.

The message flow 600 begins when the sender device 150 requests the public key for the recipient from the application server 120 in message 602. The message 602 may include information such as the address mechanism of the recipient to which a message will be sent, or other identifying information for the recipient.

The message flow 600 continues when the application server 120 provides the public key of the recipient in message 604.

The message flow 600 continues when the sender device 150 encrypts a message with the public key in message 606. The encrypted message 152 may be in a text format or may be a video or audio recording.

The message flow 600 continues when the sender device 150 sends the encrypted message to the application server 120 in message 608.

The message flow 600 continues when the application server 120 sends a notification that an encrypted message has been received to the recipient device 110 in message 610. The message 610 may be in any format, including a format that matches the format of the encrypted message or a format different from the format of the encrypted message.

The message flow 600 continues when the recipient device 110 requests the encrypted message from the application server 120 in message 612. The application server 120 may respond by sending, or providing an access link to, the encrypted message to the recipient device 110 in message 614.

The message flow 600 continues when the recipient device 110 authenticates the recipient in message 616. Authenticating the recipient is described with respect to message flow 700 in FIG. 7. Authenticating the recipient may cause a passphrase to be generated from a newly taken image of the recipient's ear.

Assuming successful authentication, the message flow 600 continues when the recipient device 110 decrypts the encrypted message and presents the message through a speaker in message 618. Decrypting the message may be performed with the private key, retrieved with the passphrase generated during authentication.

In some embodiments, the encrypted message 152 may be sent directly to the recipient without the use of the application server 120, or via a messaging server such as an e-mail host server or the like. In such embodiments, some or all of the messages 610, 612, and 614 may not occur, or may occur between the recipient device and the device that stored the encrypted message.

Figure 7:
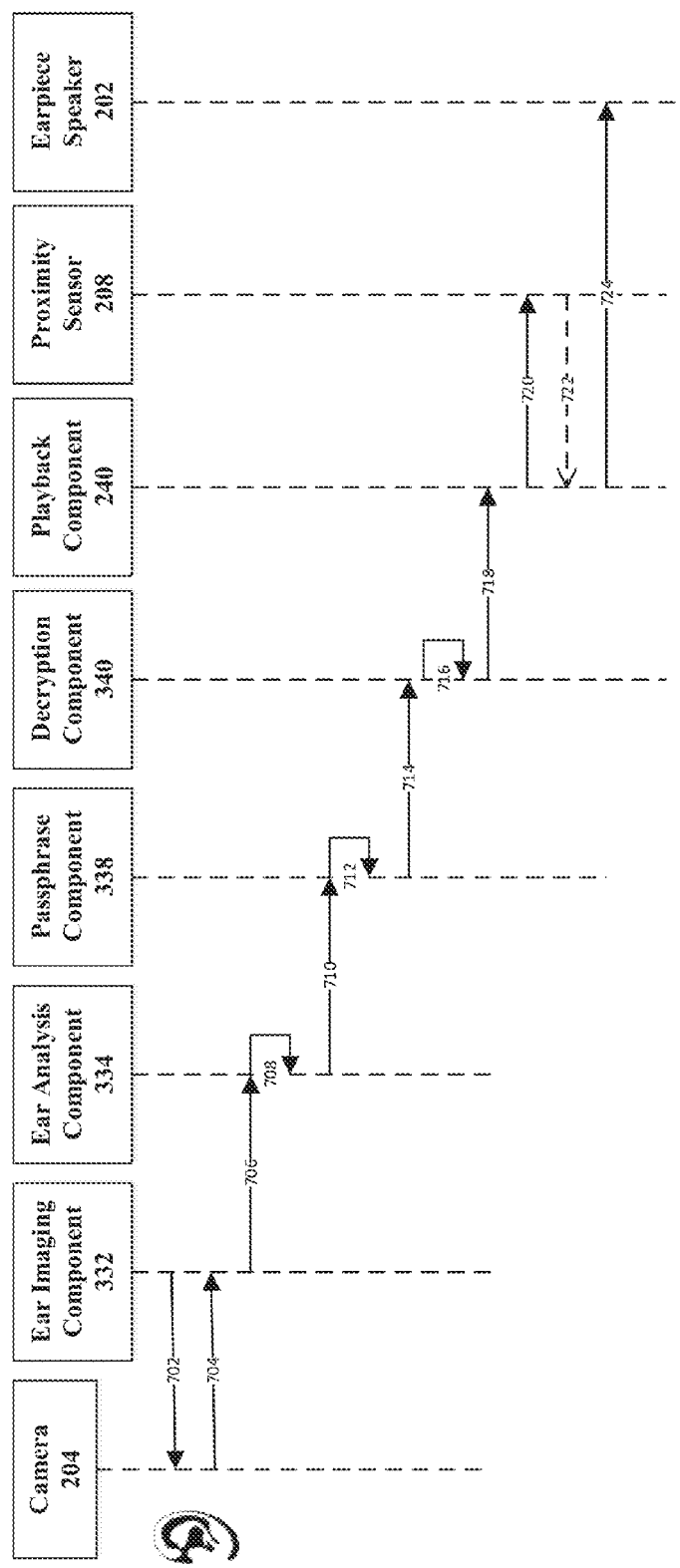
FIG. 7 illustrates an embodiment of a third message flow for the system of FIG. 1.

FIG. 7 illustrates an embodiment of a message flow 700 for the system 100. 100. The message flow 700 may represent messages communicated among the components of system 100. In particular, the message flow 700 may occur among the components of the mobile device 110, 200, and more particularly, among the components of the message authentication component 330.

In message flow 700, time flows from the top of the diagram toward the bottom. Message flow 700 may represent messages communicated during authentication and playback operations such as during messages 616 and 618 in message flow 600. The message flow 700 assumes that an encrypted message for the recipient has been received by the mobile device of the recipient.

The message flow 700 begins similarly to message flow 500. Messages 702-712 may be the same as messages 502-512 and their description is not repeated here.

Once the passphrase is generated from a newly acquired image of the recipient's ear, the message flow 700 continues when the passphrase component 338 provides the passphrase to the decryption component 340 in message 714. The message 714 may include the passphrase or an obscured passphrase, and may also include a command or directive to the decryption component 340 to decrypt the received encrypted message.

The message flow 700 continues when the decryption component 340 retrieves the private key and decrypts the encrypted message in message 716. If the passphrase provided in message 714 (plain or obscured) is the same as the one that was used to lock the private key, then the private key may be retrieved and used to decrypt the message.

If the provided passphrase differs from the one used to lock the private key, then the private key cannot be unlocked and the authentication fails. The recipient will not be able to access the message.

The message flow 700 continues when the decryption component 340 instructs the playback component 240 to present the decrypted message in message 718. The message 718 may include the decrypted message, or a link or reference to the decrypted message.

The message flow 700 continues when the playback component 240 requests a proximity measurement from the proximity sensor 208 in message 720. In some embodiments, the playback component 240 may also output an audible signal to the recipient that the message is ready for playback, and may prompt the recipient to place the earpiece speaker 202 close to their ear.

The message flow 700 continues when the proximity sensor 208 responds with message 722. The message 722 may include a proximity measurement or an indication that the proximity of the device to the recipient's head or ear is within a threshold or outside of a threshold.

If the device is within the threshold proximity, the message flow 700 continues when the playback component 240 directs the earpiece speaker 202 to play an audio version of the message, in message 724. Messages 720 and 722 may repeat continuously or at short repeated intervals throughout the playback of the message. If at any point the proximity exceeds the threshold, the playback component 240 may stop the output of the message (not shown).

Figure 8:
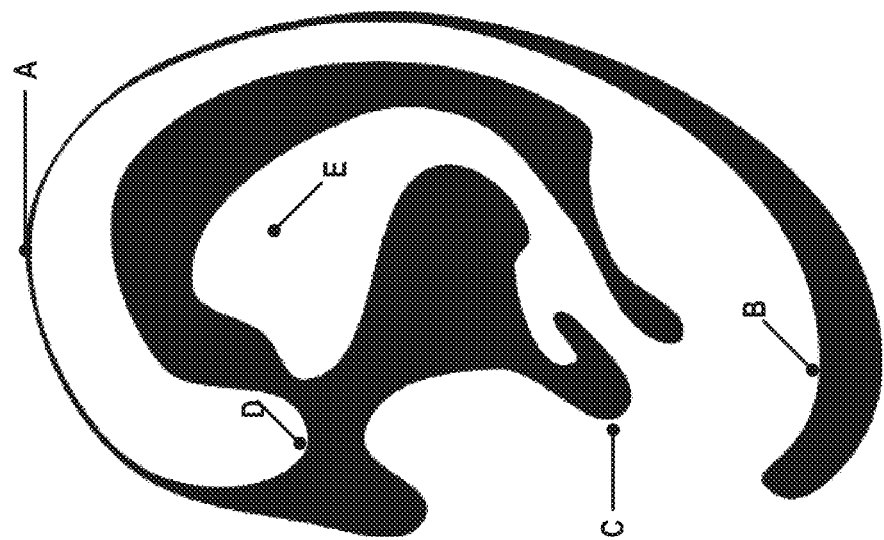
FIG. 8 illustrates a diagram of a human ear.

FIG. 8 illustrates an image 800 of a human ear. The image 800 is a simplified drawing for the purposes of example, and is not intended to limit the embodiments. As shown, a human ear may have various features that may, in some numeric representations, uniquely identify the ear, or identify the ear with a large degree of certainty. For example, and without limitation, an ear may include a point A that represents the highest point on the outer ear. An ear may include an earlobe, indicated by point B. Point C represents the location of the opening to the middle ear. Point D may represent the point at which the upper portion of the outer ear connects to the face. Point E may represent a prominent ridge or fold within the outer ear.

It is not yet known with scientific certainty whether each human ear is unique among all human ears. There is, however, a great deal of variation among ears, even between the two ears of one person. Accordingly, various numeric representations may be determined from the detected features on an image of an ear that may be sufficient to distinguish one ear from another. For example, the distance between any two of the points may be measured, e.g. point A to point D, point A to point B, point C to point E, and so forth. In some embodiments, a ratio of two distances may be computed, e.g. AB to CE. In some embodiments, a positional relationship may be determined, e.g. that point A is above point C and to the right of point B. In some embodiments, a combination of any of these methods may be used to arrive at a numeric representation of the ear that uniquely, or with substantial certainty, identifies the ear and thus the person.

In some embodiments, two images of the same ear taken from slightly different angles may be used to arrive at a numeric representation. This may prevent the use of a photograph held up to the camera to falsely authenticate a person. In some embodiments, images of both ears may be used to improve the certainty of identification.

Figure 9:
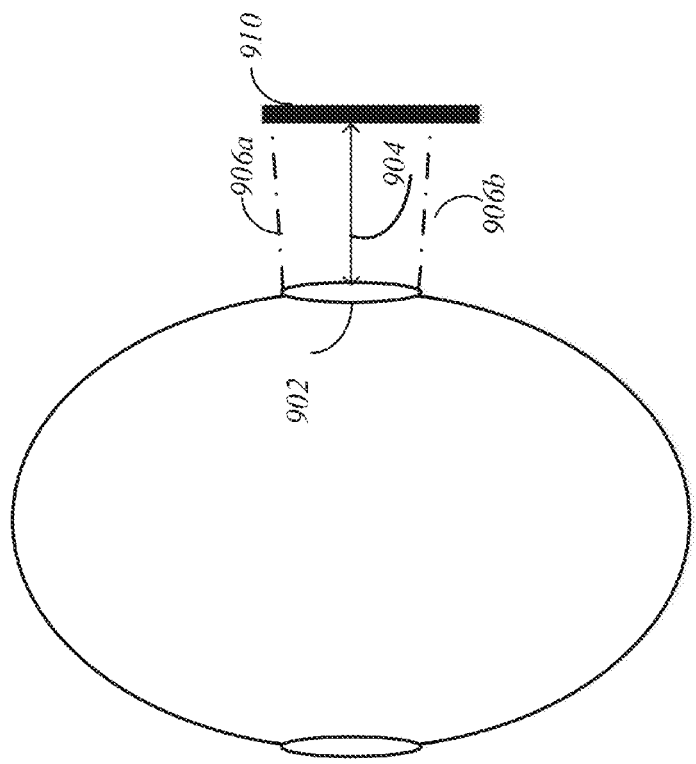
FIG. 9 illustrates a diagram of ear-device proximity and placement for the system of FIG. 1.

FIG. 9 illustrates a proximity/ear placement diagram 900. The diagram 900 shows a mobile device 910 held near an ear 902. The separation shown is exaggerated and not to scale for illustration purposes. The proximity of the mobile device 910 to the ear 902 may be measured as shown by a proximity line 904. In an embodiment, a threshold proximity may be, for example, one inch, one half-inch, or one quarter-inch.

The lines 906a and 906b may represent the top and bottom, respectively, of the field of view of the camera. In the diagram 900, the ear 902 is within and fills the field of view at least from top to bottom. In some embodiments, the threshold proximity may be defined such that the ear 902 fills a percentage of or exceeds the field of view of the camera. When the ear 902 does not fall within the field of view as defined by the lines 906a and 906b, the ear imaging component 332 may prompt the person to move the mobile device in one or more directions to position the ear 902 within the field of view.

Figure 10:
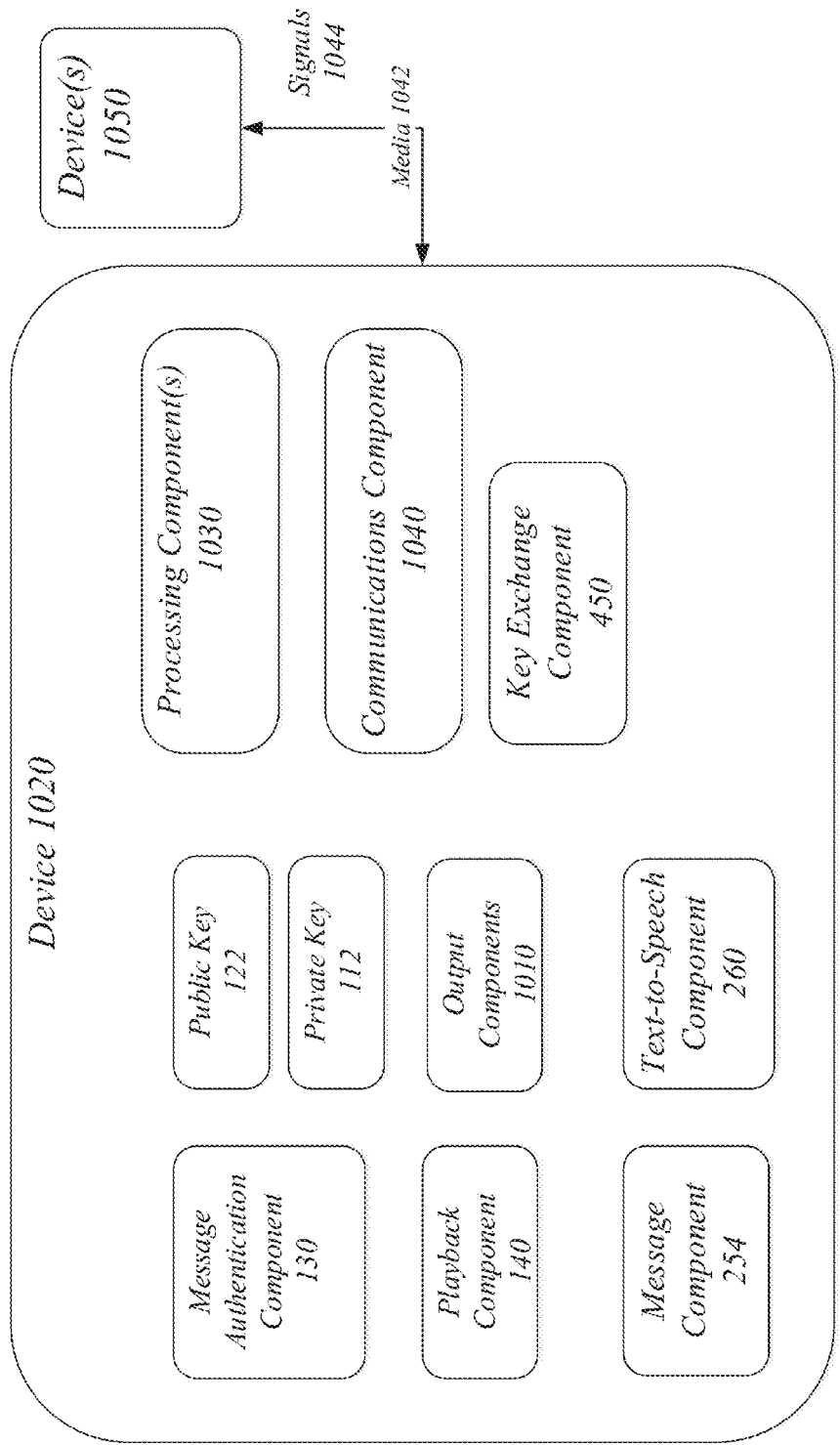
FIG. 10 illustrates an embodiment of a centralized system for the system of FIG. 1.

FIG. 10 illustrates a centralized system 1000. The centralized system 1000 may implement some or all of the structure and/or operations for the system 100 for securing delivery of an audio message in a single computing entity, such as entirely within a single device 1020. In an embodiment, the centralized system 1000 may provide the functionality described above without the use of an application server 120.

The device 1020 may comprise any electronic device capable of receiving, processing, and sending information, and may be an embodiment of a mobile device, e.g. mobile device 110 or 200. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 1020 may execute processing operations or logic for the system 100 using a processing component 1030. The processing component 1030 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1020 may execute communications operations or logic for the system 100 using communications component 1040. The communications component 1040 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1040 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1012 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1020 may communicate with other devices 1050 over a communications media 1042 using communications signals 1044 via the communications component 1040. The devices 1050 may be internal or external to the device 1020 as desired for a given implementation.

The device 1020 may include within it the message authentication component 130, the playback component 140, the message component 254, the text-to-speech component 260, and the key exchange component 450. The device 1020 may store both a public key 122 and a private key 112 and may operate as its own key exchange server through the key exchange component 450. The device 1020 may include within it various output components 1010, which may include speakers, displays, and the like, for example as shown in FIG. 2. Device 1020 may be operative to carry out the tasks of these elements using processing component 1030 and communications component 1040. Devices 1050 may comprise any of devices 120 or 150, the signals 1014 over media 1012 comprising the interactions between the device 1020 and its elements and these respective devices.

Figure 11:
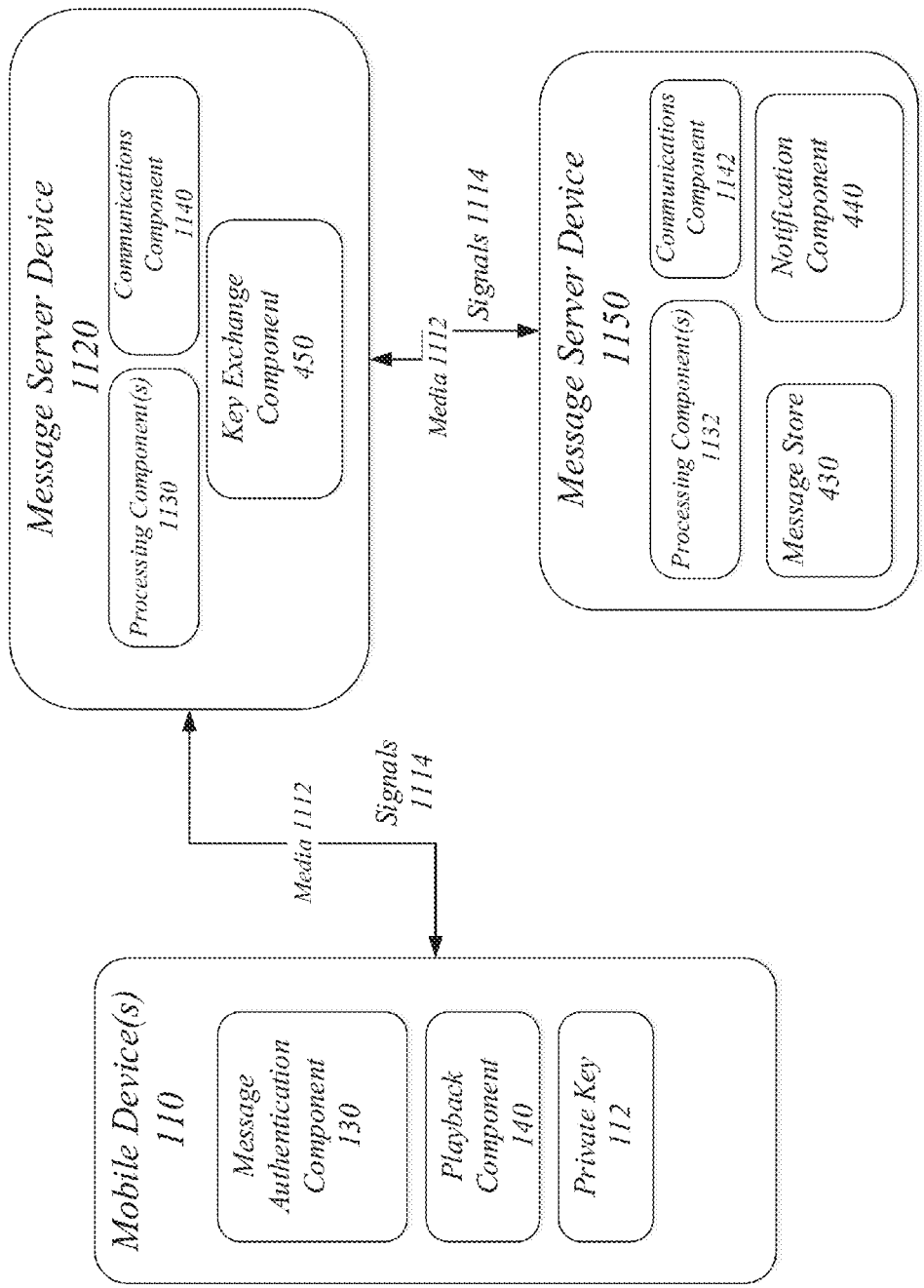
FIG. 11 illustrates an embodiment of a distributed system for the system of FIG. 1.

FIG. 11 illustrates an embodiment of a distributed system 1100. The distributed system 1100 may distribute portions of the structure and/or operations for the system 100 across multiple computing entities. Examples of distributed system 1100 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1100 may comprise message server devices 1120 and 1150. In general, the message server devices 1120 and 1150 may be similar to the device 1020 as described with reference to FIG. 10. For instance, the message server devices 1120 and 1150 may each comprise, respectively, a processing component 1130, 1132 and a communications component 1140, 1142, which are the same or similar to the processing component 1030 and the communications component 1040, respectively, as described with reference to FIG. 10. In another example, the message server devices 1120 and 1150 may communicate over a communications media 1112 using communications signals 1114 via the communications components 1140, 1142.

The message server devices 1120 and 1150 may comprise or employ one or more server programs that operate to perform various methodologies in accordance with the described embodiments. For example, message server device 1120 may implement the key exchange component 450. The message server device 1150 may implement the notification component 440 and the message store 430. It will be appreciated the server device 1120—or any of the server devices—may itself comprise multiple servers.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 12:
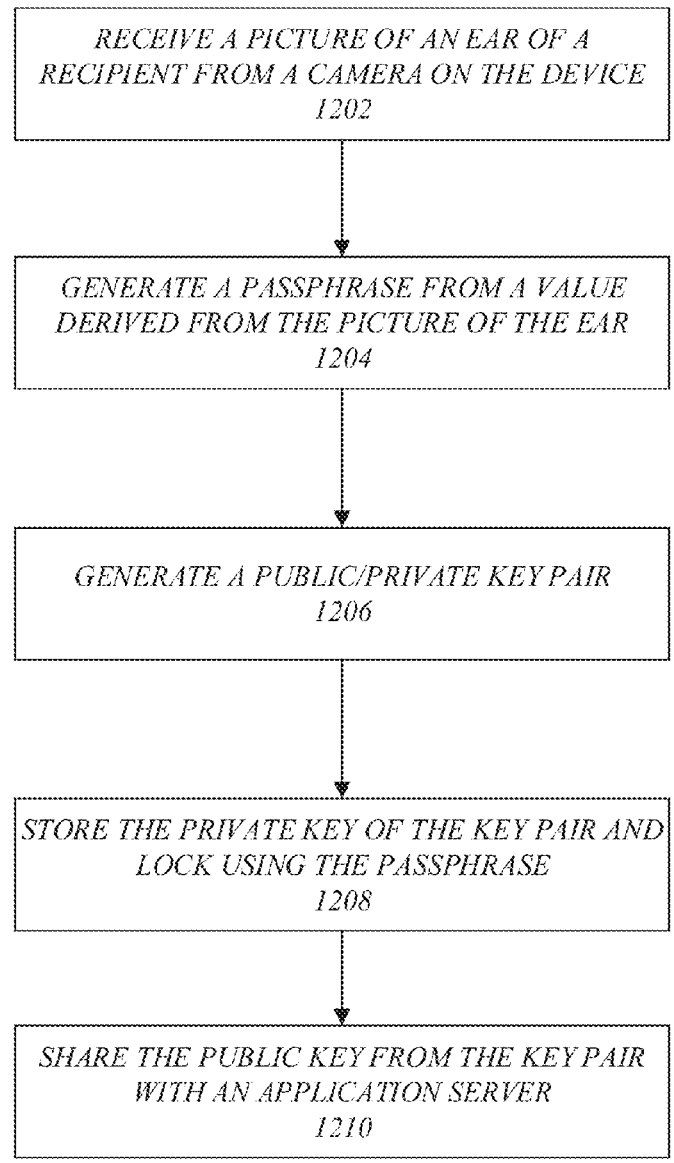
FIG. 12 illustrates an embodiment of a logic flow for the system of FIG. 1.

FIG. 12 illustrates an embodiment of a logic flow 1200 for the system 100. The logic flow 1200 may be representative of some or all of the operations executed by one or more embodiments described herein. In particular the logic flow 1200 may represent some or all of the operations performed by a message authentication component on a mobile device of a recipient to register the recipient for encrypted messages.

In the illustrated embodiment shown in FIG. 12, the logic flow 1200 may be operative at block 1202 to receive a picture of an ear of a recipient from a camera on the device. The embodiments are not limited to these examples. For example, the ear analysis component 334 of the message authentication component 330 may receive a digital photograph taken of the recipient's ear from the device camera 204.

The logic flow 1200 may be operative at block 1204 to generate a passphrase from a value derived from the picture of the ear. For example, the passphrase component 338 may receive a numeric representation of the picture of the ear, or derived from the picture of the ear from the ear analysis component 334, and may use the numeric representation to generate a passphrase. The passphrase may be unique to the numeric representation. In some embodiments, the numeric representation may be unique to the picture of the ear, that is, a picture of any other ear will not produce the identical numeric representation from the ear analysis component 334. In some embodiments, the numeric representation may not be unique, but may be substantially unlikely to occur for a large percentage of pictures of other ears, e.g. 95% or 99%.

The logic flow 1200 may be operative at block 1206 to generate a public/private key pair for the recipient. For example, the key generator component 336 may generate a key pair under the GPG encryption scheme. Other encryption methods for key pair generation may also be used.

The logic flow 1200 may be operative at block 1208 to store the private key of the key pair and to lock the private key with the passphrase. For example, the key generator component 336 may place the private key 112 in a storage medium on the mobile device 110, or on a secure storage accessible to the mobile device 110. The key generator component 336 may lock the private key 112 with the passphrase, or with an obscured version of the passphrase such that the private key 112 cannot be accessed or used to decrypt a message without the passphrase or obscured passphrase. The passphrase generated in block 1206 may be erased from the mobile device once the private key is locked.

The logic flow 1200 may be operative at block 1210 to share the public key from the key pair with an application server. For example, the key generator component 336 may send the public key to the application server 120 or 1120. The application server is then able to provide the public key to any sender who wishes to encrypt a message to the recipient.

Figure 13:
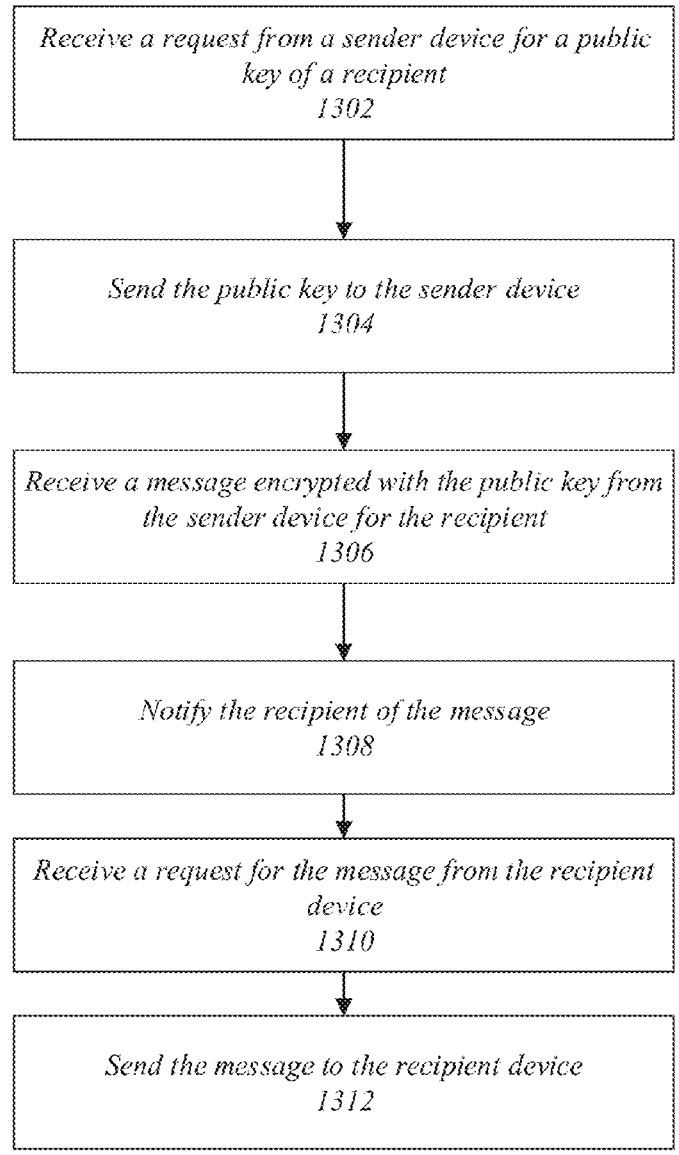
FIG. 13 illustrates an embodiment of a second logic flow for the system of FIG. 1.

FIG. 13 illustrates an embodiment of a logic flow 1300 for the system 100. The logic flow 1300 may be representative of some or all of the operations executed by one or more embodiments described herein. In particular, the logic flow 1300 may represent some or all of the operations performed by an application server, e.g. by an application server 120 or 420.

In the illustrated embodiment shown in FIG. 13, the logic flow 1300 may be operative at block 1302 to receive a request from a sender device for a public key of a recipient. For example, the application server 120 may receive a request from a sender 104, via a device 150, for a public key 122 of a recipient 102. The request may identify the recipient by a recipient identifier separate from any addressing mechanism, or may the public key for a specific address (or phone number) that encrypted messages will be sent to.

The logic flow 1300 may be operative at block 1304 to send the public key to the sender device. For example, the application server 120 may send the public key to the device 150.

The logic flow 1300 may be operative at block 1306 to receive a message encrypted with the public key from the sender device for the recipient. For example, the application server 120 may receive an encrypted message 152 from the device 150, where the encrypted message 152 is for the recipient and was encrypted using the public key received in block 1304. In some embodiments, the application server 120 may store the received message locally, or an accessible message store until the recipient requests the message.

The logic flow 1300 may be operative at block 1308 to notify the recipient of the message. For example, the application server 120 may send a message to the same address that the encrypted message was sent to, or may send, for example, a SMS message, a MMS message, cause an alert to be issued by an application component on the mobile device, e.g. via the operating system or by a messaging component, send a voicemail notification, or any other means of alerting the recipient on the mobile device that an encrypted message is awaiting retrieval by the recipient. In some embodiments, the notification may include a link or other selectable directive that, when acted on by the recipient, requests that the message be delivered to the mobile device 110.

The logic flow 1300 may be operative at block 1310 to receive a request for the message from the recipient device. For example, the message authentication component 130 may request the encrypted message from the application server 120 with a command or directive, or by requesting the source of a link provided in the notification.

The logic flow 1300 may be operative at block 1312 to send the message to the recipient device. For example, the application server 120 may retrieve the message from a message store 430 and send the message to the mobile device 110. In some embodiments, the message may be deleted from the message store immediately after delivery, or may be retained for a relatively short period, e.g. one hour or less, in the event that the originally delivery fails and needs to be re-attempted.

Figure 14:
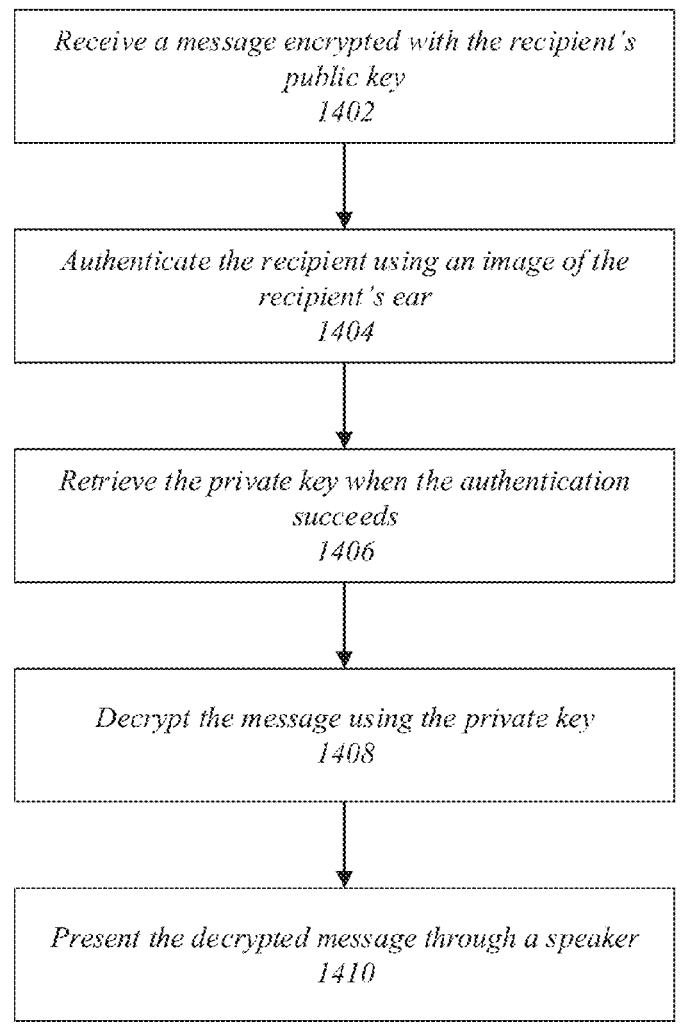
FIG. 14 illustrates an embodiment of a third logic flow for the system of FIG. 1.

FIG. 14 illustrates an embodiment of a logic flow 1400 for the system 100. The logic flow 1400 may be representative of some or all of the operations executed by one or more embodiments described herein. The operations of the logic flow 1400 may be performed by a message authentication component 130 on a mobile device 110. The message flow 1400 may represent what occurs at the mobile device 110 after block 1312 of the logic flow 1300.

In the illustrated embodiment shown in FIG. 14, the logic flow 1400 may be operative at block 1402 to receive a message encrypted with the recipient's public key. For example, the message authentication component 130 may receive an encrypted message 152 from the application server 120, or from the sender device 150 or another messaging server.

The logic flow 1400 may be operative at block 1404 to authenticate the recipient using an image of the recipient's ear. For example, the message authentication component 130 may instruct the camera 204 to take a picture of the recipient's ear, analyze the picture to generate a passphrase based on the picture. In some embodiments, authentication may including testing whether the generated passphrase can unlock the private key. In some embodiments, authentication may include comparing the current picture of the recipient's ear with an earlier picture. In some embodiments, authentication may include comparing a numeric representation of the current picture of the recipient's ear with a numeric representation of an earlier picture of the ear.

The logic flow 1400 may be operative at block 1406 to retrieve the private key when the authentication succeeds. For example, the message authentication component 130 may use the passphrase to unlock the private key and load the private key into a memory unit for use by the decryption component 340.

In some embodiments, the block 1404 and 1406 may be combined. That is, the recipient may be considered authenticated when the generated passphrase unlocks the private key.

The logic flow 1400 may be operative at block 1408 to decrypt the message using the private key. For example, the decryption component 340 of the message authentication component 130 may use the private key to decrypt the message 152 using whatever encryption method was applied to the original message.

The logic flow 1400 may be operative at block 1410 to present the decrypted message through a speaker. For example, the playback component 140 may output an audio message to the earpiece speaker 202 of the mobile device 110. If the message is text-based, the text-to-speech component 260 may convert the message text to an audio signal for output by the earpiece speaker.

Figure 15:
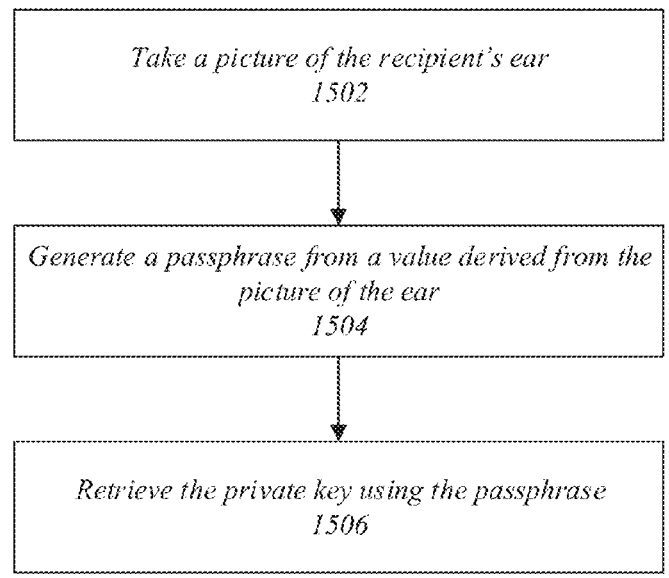
FIG. 15 illustrates an embodiment of a fourth logic flow for the system of FIG. 1.

FIG. 15 illustrates an embodiment of a logic flow 1500 for the system 100. The logic flow 1500 may be representative of some or all of the operations executed by one or more embodiments described herein. The operations of the logic flow 1500 may be performed by a message authentication component 130 on a mobile device 110 and may represent a more detailed flow for blocks 1404 and 1406 of the logic flow 1400.

In the illustrated embodiment shown in FIG. 15, the logic flow 1500 may be operative at block 1502 to take a picture of the recipient's ear. For example, the ear imaging component 332 may prompt the recipient to move the mobile device 110 to place the recipient's ear in the view of the camera 204 and may instruct the camera 204 to take the picture.

The logic flow 1500 may be operative at block 1504 to generate a passphrase from a value derived from the picture of the ear. For example, the ear analysis component 334 may receive the picture taken in block 1502 and may perform any of a variety of image analysis techniques to create a numeric representation of the image, as described above. The numeric representation may be used by the passphrase component 338 to generate a passphrase as described above. In some embodiments, the passphrase may be obscured, for example, by executing a hashing function on the passphrase.

The logic flow 1500 may be operative at block 1506 to retrieve the private key using the passphrase. For example, the decryption component 340 may locate the private key 112 and may use the passphrase, or an obscured passphrase to unlock the private key.

Figure 16:
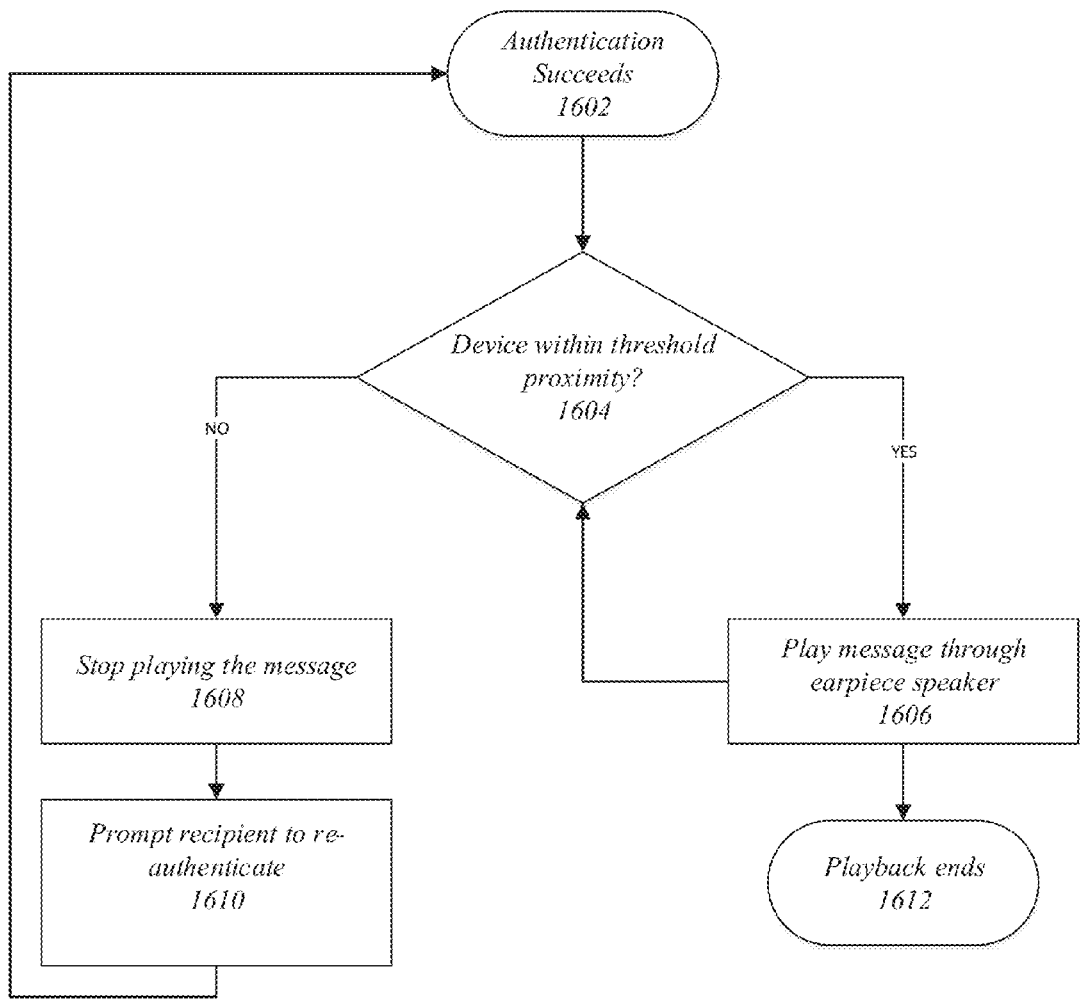
FIG. 16 illustrates an embodiment of a fifth logic flow for the system of FIG. 1.

FIG. 16 illustrates an embodiment of a logic flow 1600 for the system 100. The logic flow 1500 may be representative of some or all of the operations executed by one or more embodiments described herein. The operations of the logic flow 1600 may be performed by playback component 140 on a mobile device 110 during the presentation of a decrypted message.

In the illustrated embodiment shown in FIG. 16, the logic flow 1600 may begin at block 1602 when authentication of the recipient has succeeded and the message is decrypted and ready for audio output.

The logic flow 1600 may be operative at block 1604 to detect whether the mobile device 110 is within a threshold proximity to the head or ear of the recipient. For example, the playback component 140 may receive information from the proximity sensor 208 about the proximity of the device 110 to the recipient's head/ear. In some embodiments, block 1604 may operate continuously while the message is being presented.

The logic flow 1600 may be operative at block 1606 to play the message through the earpiece speaker, as long as the proximity remains within the threshold proximity in block 1604.

The logic flow 1600 may be operative at block 1608 to stop playing the message as soon as the proximity exceeds the threshold proximity at block 1604.

The logic flow 1600 may be operative at block 1610 to prompt the recipient to re-authenticate themselves before playing the message. For example, the playback component 140 may play an audio message, or may display a visual message, that the decrypted message cannot be played until the recipient repeats the authentication procedure. The recipient may then need to cause the blocks 1404, 1406 and 1408 to repeat.

Figure 17:
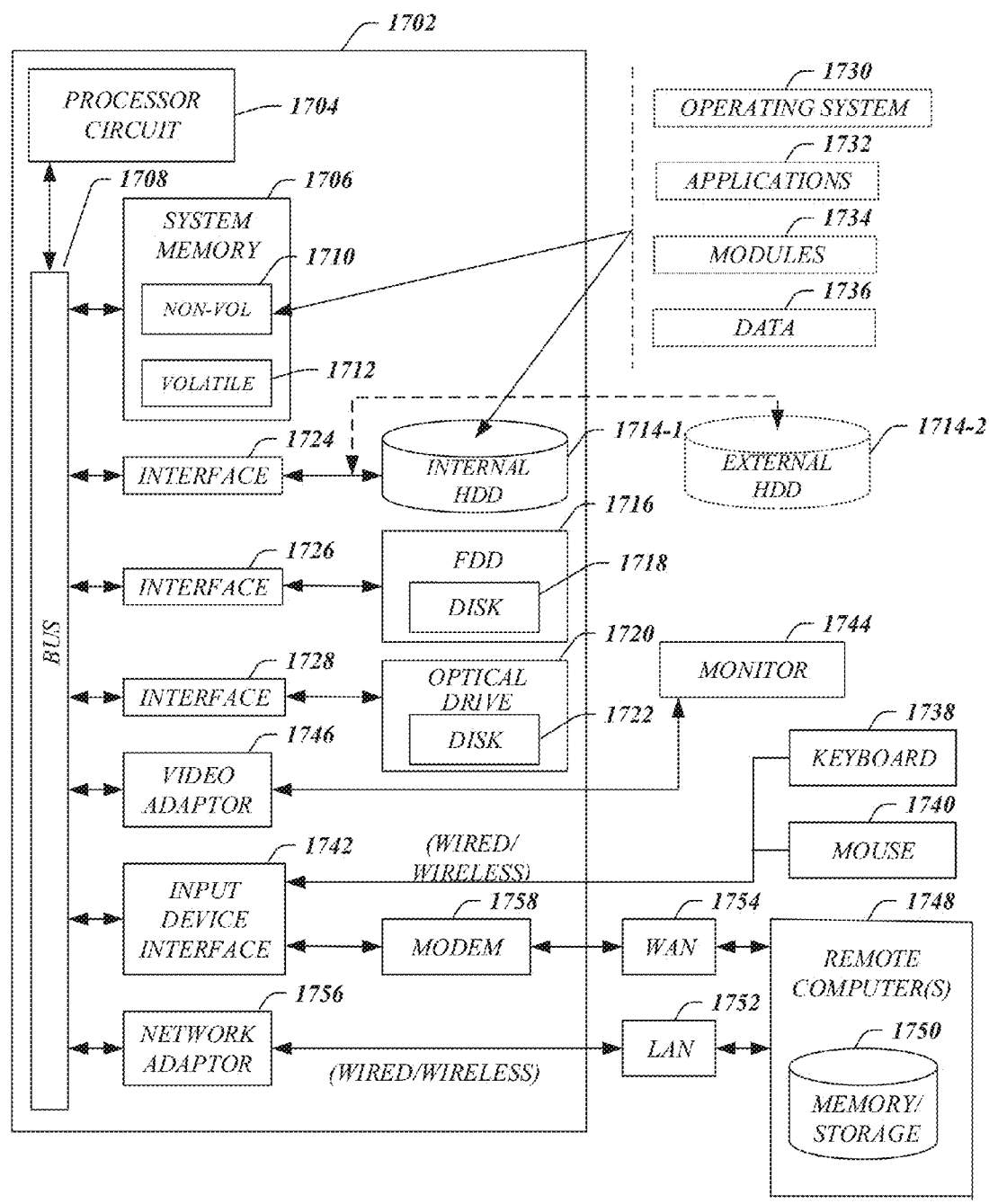
FIG. 17 illustrates an embodiment of a computing architecture.

FIG. 17 illustrates an embodiment of an exemplary computing architecture 1700 suitable for implementing various embodiments as previously described. In one embodiment, the computing architecture 1700 may comprise or be implemented as part of an electronic device. Examples of an electronic device may include those described with reference to FIGS. 10-11, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1700.

As shown in FIG. 17, the computing architecture 1700 comprises a processing circuit 1704, a system memory 1706 and a system bus 1708. The processing circuit 1704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1704.

The system bus 1708 provides an interface for system components including, but not limited to, the system memory 1706 to the processing circuit 1704. The system bus 1708 can be any of several types of bus structure that may further interconnect to a memory bus (with or without a memory controller), a peripheral bus, and a local bus using any of a variety of commercially available bus architectures. Interface adapters may connect to the system bus 1708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 17, the system memory 1706 can include non-volatile memory 1710 and/or volatile memory 1712. A basic input/output system (BIOS) can be stored in the non-volatile memory 1710.

The computer 1702 may include various types of computer-readable storage media in the form of one or more lower speed memory units, including an internal (or external) hard disk drive (HDD) 1714-1 and 1714-2, respectively, a magnetic floppy disk drive (FDD) 1716 to read from or write to a removable magnetic disk 1718, and an optical disk drive 1720 to read from or write to a removable optical disk 1722 (e.g., a CD-ROM or DVD). The HDD 1714, FDD 1716 and optical disk drive 1720 can be connected to the system bus 1708 by a HDD interface 1724, an FDD interface 1726 and an optical drive interface 1728, respectively. The HDD interface 1724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1710, 1712, including an operating system 1730, one or more application programs 1732, other program modules 1734, and program data 1736. In one embodiment, the one or more application programs 1732, other program modules 1734, and program data 1736 can include, for example, the various applications and/or components of the message authentication component 130, 230, 330; the playback component 140, 240; the notification component 440; and the key exchange component 450.

An operator can enter commands and information into the computer 1702 through one or more wire/wireless input devices, for example, a keyboard 1738 and a pointing device, such as a mouse 1740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1704 through an input device interface 1742 that is coupled to the system bus 1708, but can be connected by other interfaces such as a parallel port, IEEE 1394 serial port, a game port, a USB port, an IR interface, and so forth.

A monitor 1744 or other type of display device is also connected to the system bus 1708 via an interface, such as a video adaptor 1746. The monitor 1744 may be internal or external to the computer 1702. In addition to the monitor 1744, a computer typically includes other peripheral output devices, such as speakers, printers, and so forth.

The computer 1702 may operate in a networked environment using logical connections via wire and/or wireless communications to one or more remote computers, such as a remote computer 1748. The remote computer 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wire/wireless connectivity to a local area network (LAN) 1752 and/or larger networks, for example, a wide area network (WAN) 1754. Such LAN and WAN networking environments are commonplace in offices and companies, and facilitate enterprise-wide computer networks, such as intranets, all of which may connect to a global communications network, for example, the Internet.

When used in a LAN networking environment, the computer 1702 is connected to the LAN 1752 through a wire and/or wireless communication network interface or adaptor 1756. The adaptor 1756 can facilitate wire and/or wireless communications to the LAN 1752, which may also include a wireless access point disposed thereon for communicating with the wireless functionality of the adaptor 1756.

When used in a WAN networking environment, the computer 1702 can include a modem 1758, or is connected to a communications server on the WAN 1754, or has other means for establishing communications over the WAN 1754, such as by way of the Internet. The modem 1758, which can be internal or external and a wire and/or wireless device, connects to the system bus 1708 via the input device interface 1742. In a networked environment, program modules depicted relative to the computer 1702, or portions thereof, can be stored in the remote memory/storage device 1750. It will be appreciated that the network connections shown are exemplary and other means of establishing a communications link between the computers can be used.

The computer 1702 is operable to communicate with wire and wireless devices or entities using the IEEE 802 family of standards, such as wireless devices operatively disposed in wireless communication (e.g., IEEE 802.21 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.21x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 18:
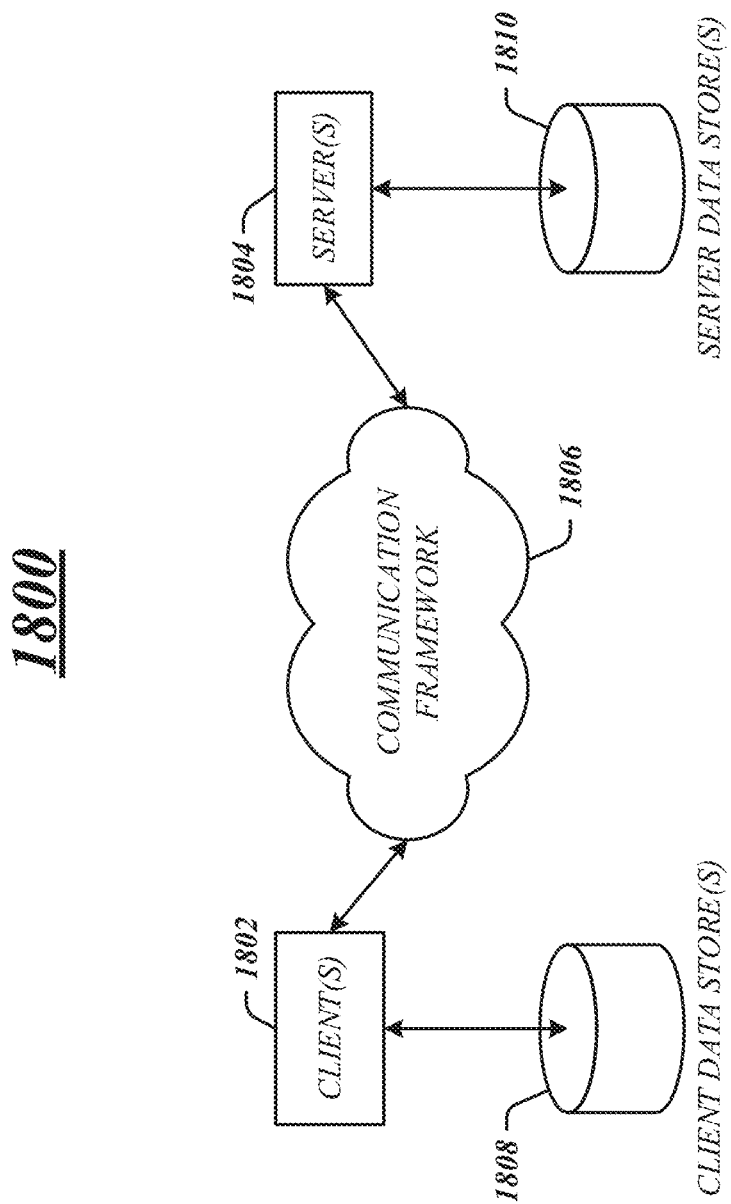
FIG. 18 illustrates an embodiment of a communications architecture.

FIG. 18 illustrates a block diagram of an exemplary architecture 1800 suitable for implementing various embodiments as previously described. The communications architecture 1800 includes various common communications elements, such as a transmitter, receiver, transceiver, radio, network interface, baseband processor, antenna, amplifiers, filters, power supplies, and so forth. The embodiments, however, are not limited to this implementation by the communications architecture 1800.

As shown in FIG. 18, the communications architecture 1800 comprises one or more clients 1802 and servers 1804. The clients 1802 may implement the devices 1020 and 1050. The servers 1804 may implement the server devices 1120 or 1150. The clients 1802 and the servers 1804 are operatively connected to one or more respective client data stores 1808 and server data stores 1810 that can be employed to store information local to the respective clients 1802 and servers 1804, such as cookies and/or associated contextual information.

The clients 1802 and the servers 1804 may communicate information among each other using a communication framework 1806. The communications framework 1806 may implement any well-known communications techniques and protocols. The communications framework 1806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1806 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1802 and the servers 1804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Accordingly, embodiments include methods, apparatuses, and computer-readable storage media for content enhancement on mobile devices. For example, a method may include receiving a message encrypted with a public key from a sender at a recipient device. The method may include authenticating the recipient using an image of an ear of the recipient; retrieving a private key when the authentication succeeds; and decrypting the message using the private key. The method may include presenting the decrypted message through a speaker on the recipient device. The speaker may be an earpiece speaker on the recipient device.

The method may also include taking a picture of the ear of the recipient with a camera on the recipient device; generating a passphrase from a value derived from the picture of the ear; generating a public/private key pair using the passphrase; and sharing the public key from the key pair with an application server. The method may include locking the private key of the key pair using a hashed version of the value.

The method for authenticating may include taking a picture of the ear of the recipient using a camera on the recipient device; generating a passphrase from a value derived from the picture of the ear; and retrieving the private key using the passphrase. Generating the passphrase may include detecting at least two ear features on the picture of the ear; deriving a relationship between the features; and assigning the value according to the relationship. Deriving a relationship may include one or more of: calculating a distance between the at least two ear features; determining a positional relationship of the at least two features; or calculating a ratio of a distance between the at least two features and a distance between a different pair of features. In some embodiments, the method may include converting the picture of the ear into a numerical form substantially unique to the recipient. In some embodiments, the method may include taking at least two pictures of the ear of the recipient; and generating the passphrase from a value derived from the at least two pictures of the ear. In some embodiments, the method may include retrieving the private key using a hashed value of the passphrase.

The method may include stopping the presenting of the decrypted message when the ear of the recipient moves outside of a threshold proximity to the recipient device. The method may require that the recipient repeat the authenticating when the presenting is stopped before presenting the message again.

The method may include converting a text-based message to audio output for presenting.

The method may include presenting a notification that the authenticating was successful, and may include prompting the recipient to place the recipient device to the ear of the recipient when authenticating succeeds.

The method may include preventing presentation of the decrypted message to a loudspeaker on the recipient device and/or to any device coupled to an audio-out connection of the recipient device.

The method may include receiving a notification from an application server that an encrypted message is available; and retrieving the encrypted message from the application server.

An apparatus may include one or more processing circuits; a camera; an earpiece speaker; and a storage unit storing instructions for a message authentication component and a playback component. The instructions for the message authentication component, when executed by the one or more processing circuits, causes the message authentication component to: receive a message encrypted with a public key from a sender; authenticate a recipient using an image of an ear of the recipient taken by the camera; retrieve a private key when the authentication succeeds; and decrypt the message using the private key. The instructions for the playback component, when executed by the one or more processing circuits causes the playback component to present the decrypted message through the earpiece speaker.

The instructions for the message authentication component may cause the message authentication component to, prior to receiving the encrypted message: take a picture of the ear of the recipient with the camera; generate a passphrase from a value derived from the picture of the ear; generate a public/private key pair using the passphrase; store the private key; and share the public key from the key pair with an application server. The message authentication component may be caused to lock the private key of the key pair using a hashed version of the value.

The instructions for the message authentication component may cause the message authentication component to authenticate the recipient by: taking a picture of the ear of the recipient using a camera on the recipient device; generating a passphrase from a value derived from the picture of the ear; and retrieving the private key using the passphrase.

In some embodiments, the message authentication component may be caused to: detect at least two ear features on the picture of the ear; derive a relationship between the at least two features; and assign the value according to the relationship. The relationship may be derived by at least one of: calculating a distance between the at least two ear features; determining a positional relationship of the at least two features; or calculating a ratio of a distance between the at least two features and a distance between a different pair of features. In some embodiments, the message authentication component may be caused to convert the picture of the ear into a numerical form substantially unique to the recipient. In some embodiments, the message authentication component may be caused to take at least two pictures of the ear of the recipient; and generate the passphrase from a value derived from the at least two pictures of the ear. In some embodiments, the message authentication component may be caused to retrieve the private key using a hashed value of the passphrase.

The apparatus may include a proximity sensor to detect a proximity of the ear of the recipient to the apparatus and/or to the earpiece speaker, and the playback component may be caused to stop the presenting of the decrypted message when the detected proximity exceeds a threshold. In some embodiments, the playback component may be caused to require that the recipient repeat the authenticating when the presenting is stopped before presenting the message again.

The storage unit may store instructions for a text-to-speech component that when executed by the one or more processing circuits, causes the apparatus to convert a text-based message to audio output for presenting.

The instructions for the message authentication component may cause the message authentication component to present a notification that the authenticating was successful. The instructions for the message authentication component may cause the message authentication component to prompt the recipient to place the recipient device to the ear of the recipient when authenticating succeeds.

The apparatus may include a loudspeaker and/or an audio-out connection, each separate from the earpiece speaker. The instructions for the playback component may cause the playback component to prevent presentation of the decrypted message to the loudspeaker and to any device coupled to the audio-out connection on the recipient device.

The instructions for the message authentication component may cause the message authentication component to receive a notification from an application server that an encrypted message is available; and retrieve the encrypted message from the application server.

A computer-readable storage medium may comprise instructions for a message authentication application that, when executed, causes a device to: receive a picture of an ear of a recipient from a camera on the device; generate a passphrase from a value derived from the picture of the ear; and generate a public/private key pair using the passphrase. The instructions may cause the device to store the private key of the key pair; and share the public key from the key pair with an application server.

The instructions may cause the device to detect at least two ear features on the picture of the ear; derive a relationship between the at least two features; and assign the value according to the relationship. The instructions to derive a relationship, when executed, may cause the device to calculate a distance between the at least two ear features; determine a positional relationship of the at least two features; and/or calculate a ratio of a distance between the at least two features and a distance between a different pair of features. The instructions may cause the device to convert the picture of the ear into a numerical form substantially unique to the recipient.

The instructions may cause the device to take at least two pictures of the ear of the recipient; and generate the passphrase from a value derived from the at least two pictures of the ear.

The instructions may cause the device to lock the private key of the key pair using a hashed version of the passphrase, and to retrieve the private key using the hashed value of the passphrase.

The instructions may cause the device to receive a message encrypted with a public key from a sender; receive a second picture of the ear of the recipient from the camera; authenticate the recipient using the second picture; retrieve the private key when the authentication succeeds; decrypt the message using the private key; and present the decrypted message through a speaker on the device.

The instructions may cause the device to generate a second passphrase from a value derived from the second picture of the ear; compare the second passphrase to the passphrase; and retrieve the private key when the second passphrase matches the passphrase.

The instructions may cause the device to detect a proximity of the ear of the recipient to at least one of the apparatus or the earpiece speaker, and stop the presenting of the decrypted message when the detected proximity exceeds a threshold. The instructions may cause the device to require that the recipient repeat the authenticating when the presenting is stopped before presenting the message again.

The instructions may cause the device to convert a text-based message to audio output for presenting.

The instructions may cause the device to present a notification that the authenticating was successful. The instructions may cause the device to prompt the recipient to place the device to the ear of the recipient when authenticating succeeds.

The instructions may cause the device to prevent presentation of the decrypted message to a loudspeaker and/or to an audio-out connection on the recipient device. The instructions may cause the device to present the decrypted message through an earpiece speaker on the recipient device.

The instructions may cause the device to receive a notification from an application server that an encrypted message is available; and retrieve the encrypted message from the application server.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receive a notification from an application server that an encrypted message is available;
authenticating a recipient using an image of an ear of the recipient;
generating a passphrase from a value derived from the image of the ear;
generating a public/private key pair using the passphrase;
sharing the public key from the key pair with an application server;
receiving the encrypted message, the message encrypted with the public key and received at a recipient device from the application server;
decrypting the message using the private key;
presenting the decrypted message through a speaker on the recipient device; and
detecting a proximity of the ear of the recipient to the recipient device, the presenting of the decrypted message configured to be stopped if the ear of the recipient moves outside of a threshold proximity to the recipient device.

2. An apparatus, comprising:
one or more processing circuits;
a camera;
an earpiece speaker; and
a storage unit storing instructions for a message authentication component and a playback component that, when executed by the one or more processing circuits, causes the message authentication component to:
receive a notification from an application server that an encrypted message is available, the encrypted message being encrypted with a public key;
receive the encrypted message encrypted from the application server;
authenticate a recipient using an image of an ear of the recipient taken by the camera;
generate a passphrase from a value derived from the image of the ear;
retrieve a private key using the passphrase;
decrypt the message using the private key; and
detect a proximity of the ear of the recipient; and
causes the playback component to present the decrypted message through the earpiece speaker, the presenting of the decrypted message configured to be stopped if the ear of the recipient moves outside of a threshold proximity to the recipient device.

3. The apparatus of claim 2, the message authentication component further to, prior to receiving the encrypted message:
take a picture of the ear of the recipient with the camera;
generate a public/private key pair using the passphrase;
store the private key; and
share the public key from the key pair with the application server.

4. The apparatus of claim 3, the message authentication component further to:

lock the private key of the key pair using a hashed version of the value.

5. The apparatus of claim 2, the message authentication component further to authenticate the recipient by:
    taking a picture of the ear of the recipient using a camera on the recipient device;
    retrieving the private key using the passphrase.

6. The apparatus of claim 5, the message authentication component further to:
    retrieve the private key using a hashed value of the passphrase.

7. The apparatus of claim 2, further comprising a proximity sensor to detect the proximity of the ear of the recipient to at least one of the apparatus or the earpiece speaker, and the playback component further to stop the presenting of the decrypted message when the detected proximity exceeds a threshold.

8. The apparatus of claim 2, further comprising at least one of: a loudspeaker separate from the earpiece speaker or an audio-out connection separate from the earpiece speaker, the playback component further to:
    prevent presentation of the decrypted message to the loudspeaker and to any device coupled to the audio-out connection.

9. The apparatus of claim 2, wherein the recipient is authenticated using images of both ears of the recipient.

10. The apparatus of claim 2, further comprising an ear imaging component configured to play audible instructions for guiding the user through taking a usable picture of the recipient's ear.

11. The apparatus of claim 2, further comprising an ear analysis component configured to generate a numeric representation of the image of the ear, wherein the passphrase is generated from the numeric representation.

12. At least one non-transitory computer-readable storage medium comprising instructions for a message authentication application that, when executed, cause a device to:
    receive a notification from an application server that an encrypted message is available;
    receive a picture of an ear of a recipient from a camera on the device;
    generate a passphrase from a value derived from the picture of the ear;
    generate a public/private key pair using the passphrase;
    store the private key of the key pair;
    share the public key from the key pair with the application server;
    retrieve the encrypted message from the application server;
    authenticate the recipient based at least in part on the received picture of the ear;
    decrypt the message using the private key;
    present the decrypted message through a speaker on the device; and
    detect a proximity of the ear of the recipient to the device, the presenting of the decrypted message configured to be stopped if the ear of the recipient moves outside of a threshold proximity to the device.

13. The computer-readable storage medium of claim 12, comprising instructions that when executed, cause the device to:
    detect at least two ear features on the picture of the ear;
    derive a relationship between the at least two features; and
    assign the value according to the relationship.

14. The computer-readable storage medium of claim 13, wherein the instructions to derive a relationship, when executed, cause the device to at least one of:
    calculate a distance between the at least two ear features;
    determine a positional relationship of the at least two features; or
    calculate a ratio of a distance between the at least two features and a distance between a different pair of features.

15. The computer-readable storage medium of claim 12, comprising instructions that when executed, cause the device to:
    receive a second picture of the ear of the recipient from the camera;
    authenticate the recipient based at least in part on the second picture; and
    retrieve the private key when the authentication succeeds.

16. The computer-readable storage medium of claim 15, comprising instructions that, when executed, cause the device to:
    detect a proximity of the ear of the recipient to at least one of the apparatus or the earpiece speaker.

17. The computer-readable storage medium of claim 12, wherein the recipient is authenticated using images of both ears of the recipient.

18. The computer-readable storage medium of claim 12, further storing instructions for playing audible instructions for guiding the user through taking a usable picture of the recipient's ear.

19. The computer-readable storage medium of claim 12, further storing instructions for generating a numeric representation of the image of the ear, wherein the passphrase is generated from the numeric representation.

20. The computer-readable storage medium of claim 12, wherein authenticating the recipient is performed based on one or more of a highest point of an outer ear, an earlobe, an opening of a middle ear, a point at which an upper portion of the outer ear connects to a face, a ridge within the outer ear, or a fold within the outer ear.

* * * * *